United States Patent [19] [11] 4,280,039
Campbell et al. [45] Jul. 21, 1981

[54] APPARATUS FOR FABRICATING AND WELDING CORE REINFORCED PANEL

[75] Inventors: James R. Campbell, South Laguna; Roy L. Anspach, Anaheim, both of Calif.

[73] Assignees: Thomas P. Mahoney, Balboa Island; Donald A. Ruston; Robert S. Barnes, both of Newport Beach; Edward K. Nance, Jr.; The Nance Childrens's Trust, both of Fullerton; Gloria I. Ruston, Laguna Niguel; Jeane O'Connor, Fullerton; Terri Lynn Ruston; Donald Alan Ruston, both of Laguna Niguel; Donald M. Cislo; George E. Schick, both of Marina Del Ray, all of Calif. ; part interest to each

[21] Appl. No.: 2,761

[22] Filed: Jan. 12, 1979

[51] Int. Cl.³ ............... B23K 11/10; B23K 37/02
[52] U.S. Cl. .................. 219/78.11; 219/86.7; 219/86.8; 219/87
[58] Field of Search ......... 219/78.11, 78.12, 86.25, 219/86.33, 86.7, 86.8, 87; 228/181

[56] References Cited

U.S. PATENT DOCUMENTS

| 2,468,001 | 4/1949 | Taylor et al. | 219/87 |
| 2,820,882 | 1/1958 | Johnson | 219/78.11 |
| 3,015,715 | 1/1962 | Campbell | 219/78.11 X |
| 3,665,148 | 5/1972 | Yasenchak et al. | 219/86.33 X |
| 3,823,468 | 7/1974 | Hascoe | 219/87 X |
| 4,025,750 | 5/1977 | Keizer et al. | 219/86.25 X |

FOREIGN PATENT DOCUMENTS 519297 7/1976 U.S.S.R. .................. 219/86.25

Primary Examiner—Gene Z. Rubinson
Assistant Examiner—Keith E. George
Attorney, Agent, or Firm—Mahoney & Schick

[57] ABSTRACT

A machine or apparatus simultaneously manufacutures a core-reinforced welded panel and assembles core strips in operative relationship with the face sheets of said panel. The machine includes a first welding head which is insertable in the space between the face sheets and has welding electrode means thereupon which internally weld securement portions of the core strips to adjacent inner surfaces of face sheets of any desired thickness. The welding head includes movable jaws mounting the welding electrodes to move the welding electrodes into engagement with the securement portions of the core strips and the welding electrodes are resilient to permit them to move independently of the movable jaws and each electrode provides an electrically isolated weld. A second welding head is provided which is capable of securing web portions of the core strips by weldments to one another after the weldment of the core strips at their securement portions has been accomplished by the first welding head. Various adjustments and indexing mechanisms permit the machine to fabricate panels of different dimensions and different size core without the necessity for the extensive downtime necessitated by the utilization of prior art machines.

23 Claims, 32 Drawing Figures

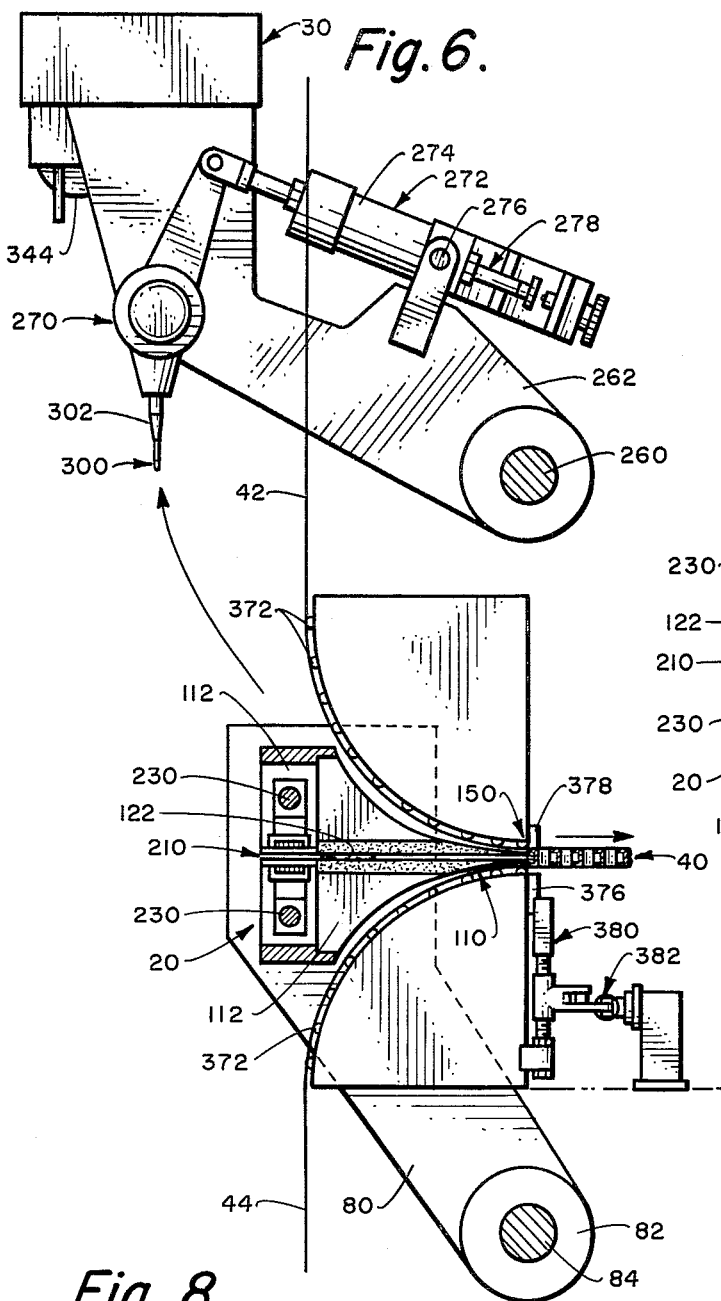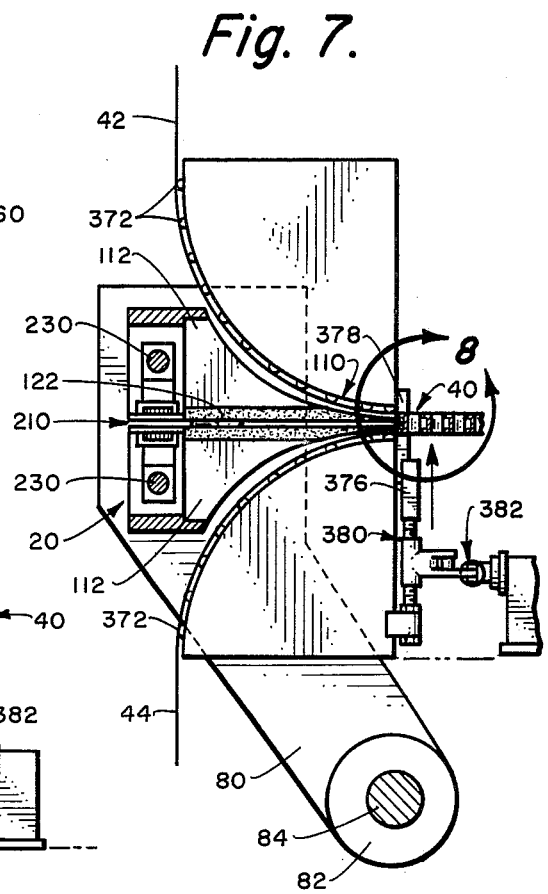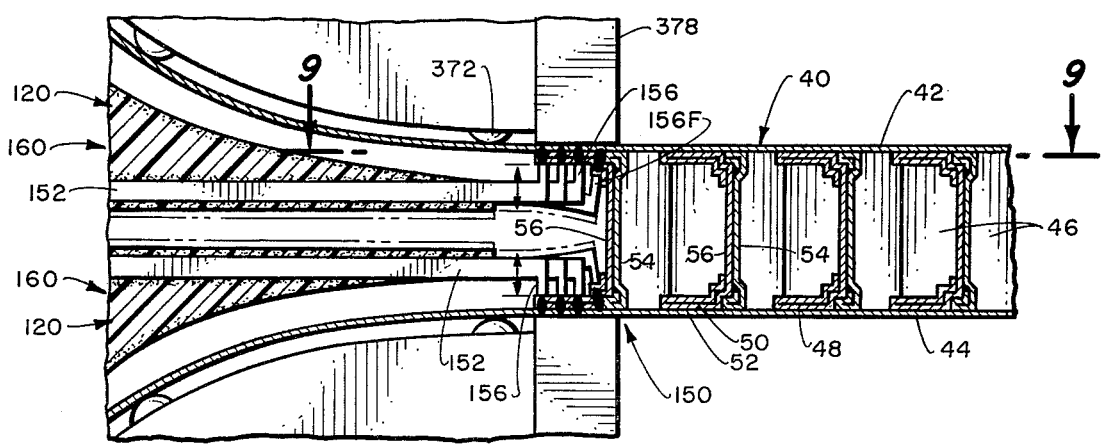

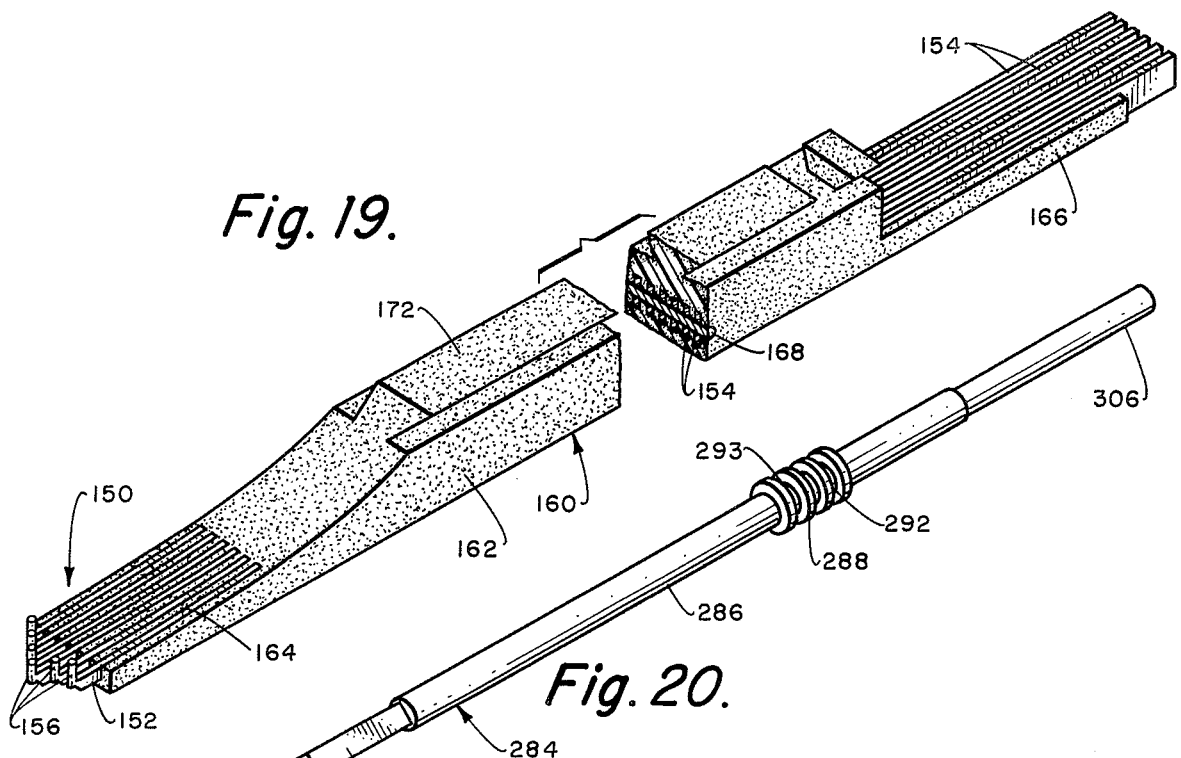
Fig. 19.
Fig. 20.
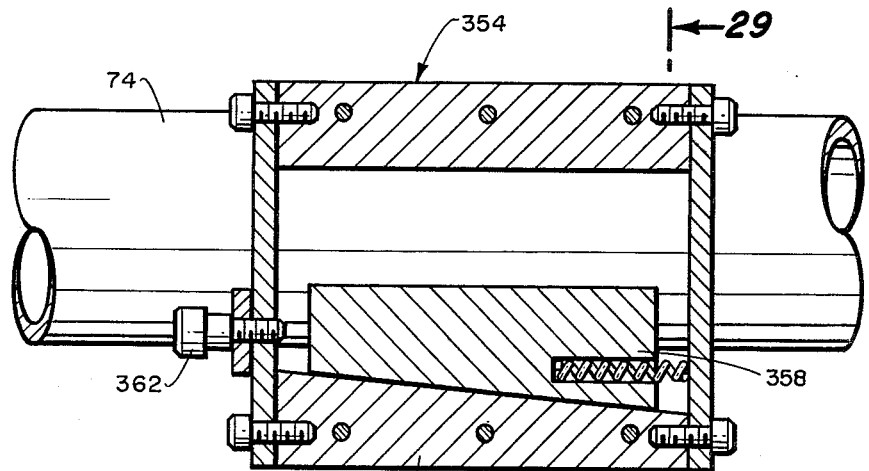
Fig. 28.
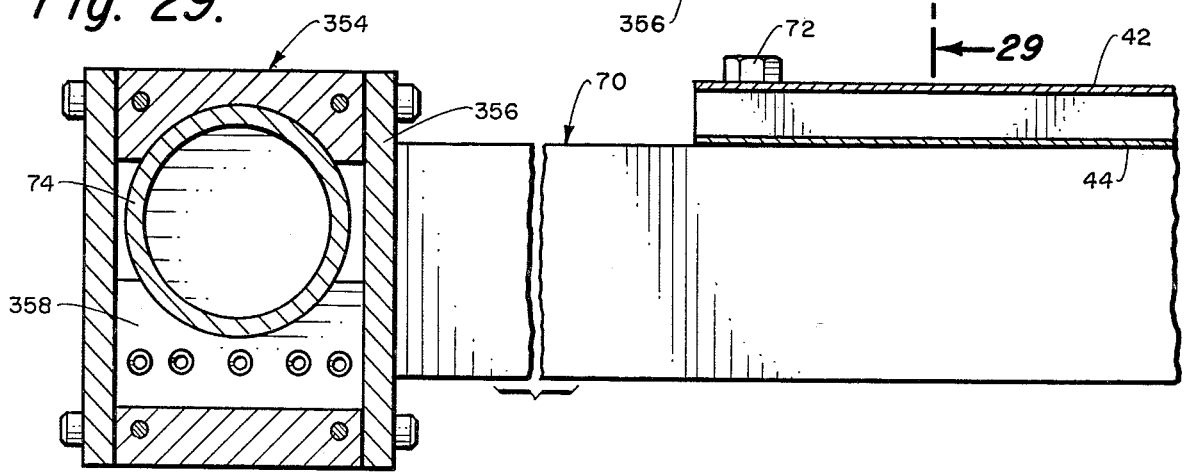
Fig. 29.

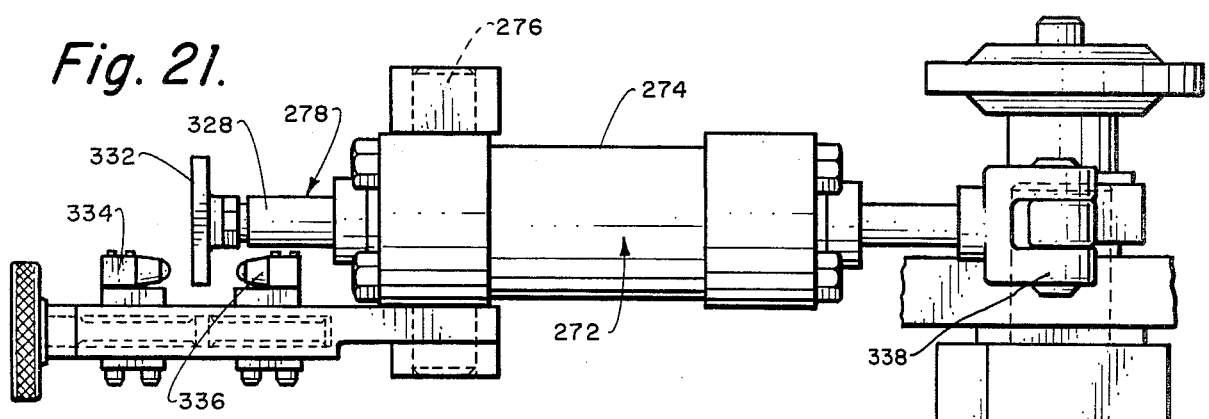
Fig. 21.
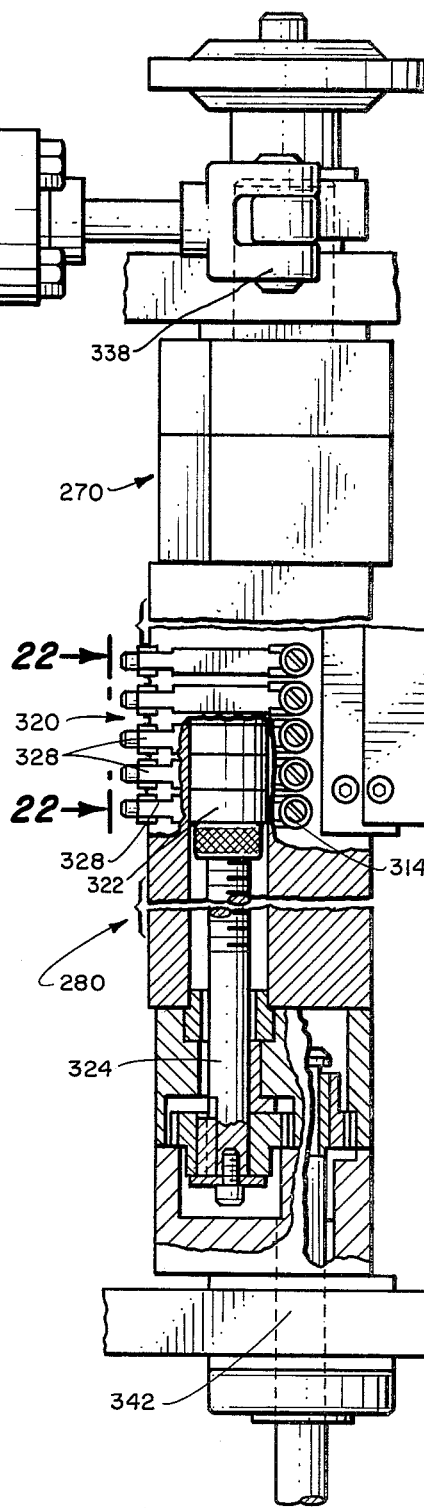
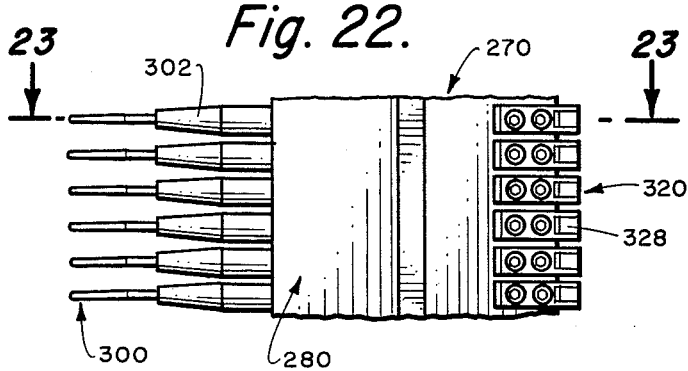
Fig. 22.
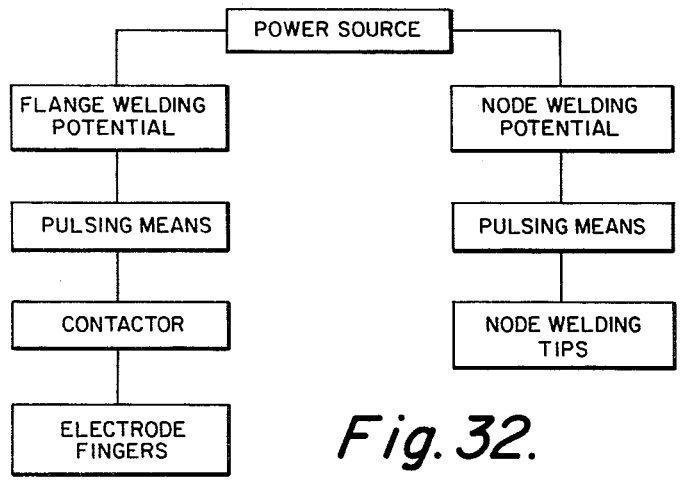
Fig. 32.

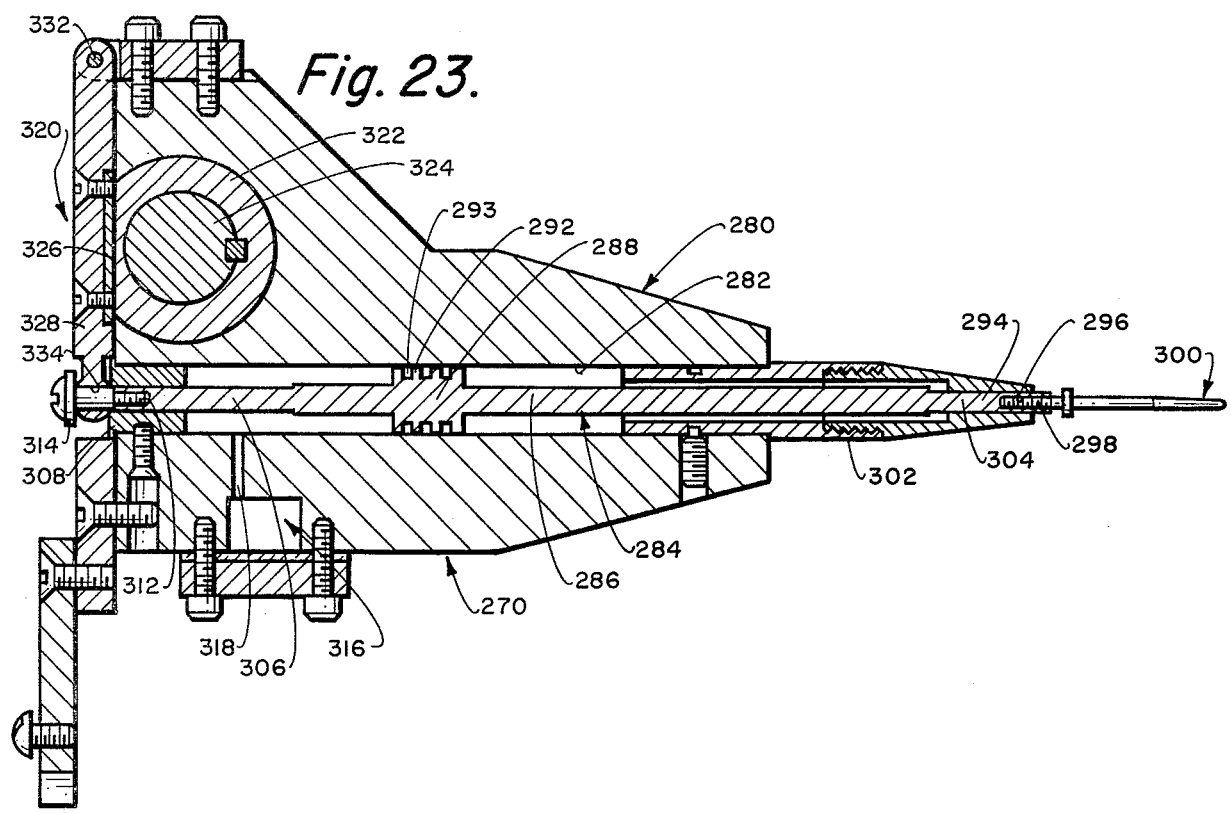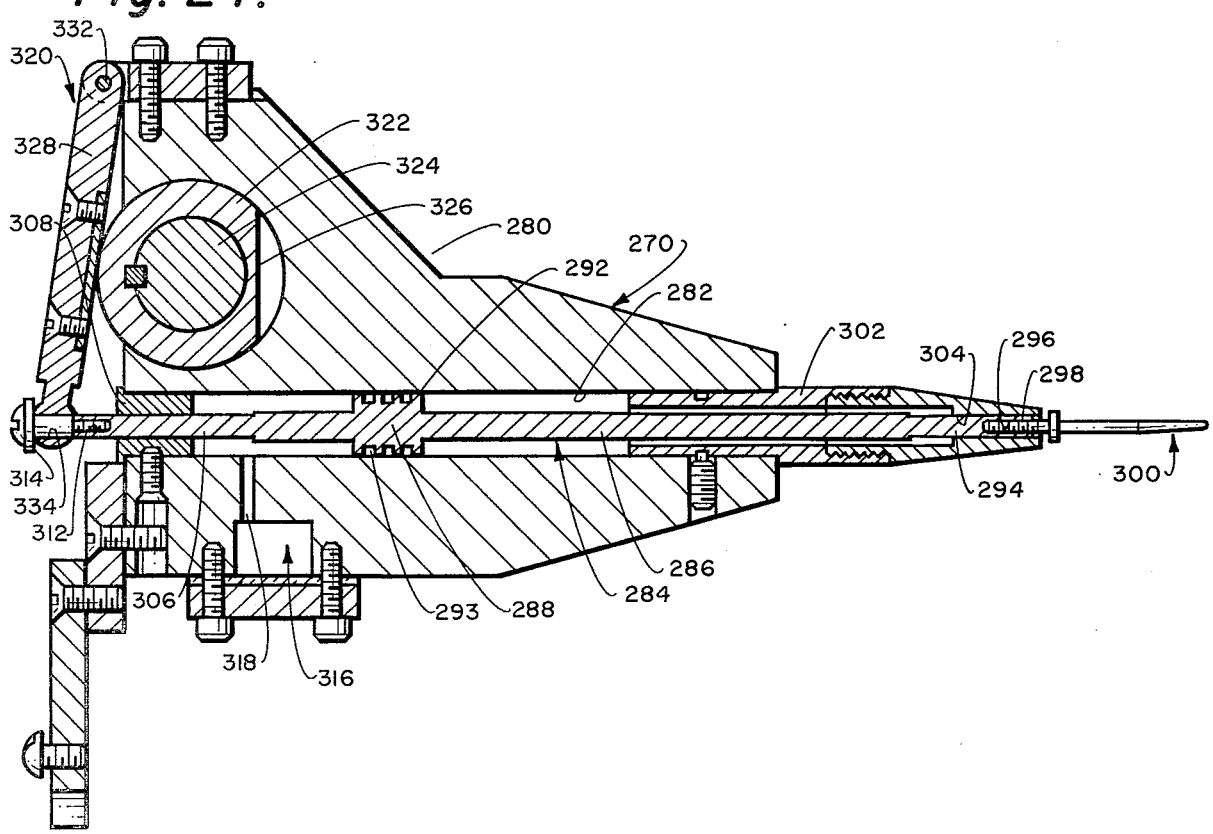

Fig. 31.

| OUTPUTS | SEQUENCE | MICROSWITCH BEGIN | PRIMARY CARRIAGE | | INDEX 260 | | INDEX 250 | | INDEX 520 | | AIR BAG | | CLUTCH | | LOWER JAW | | SECONDARY CARRIAGE | | MICROSWITCH END | READS OUTPUT NUMBERS |
|---|---|---|---|---|---|---|---|---|---|---|---|---|---|---|---|---|---|---|---|---|
| | | | UP | DOWN | LEFT | RIGHT | OUT | IN | LEFT | RIGHT | ON (OFF) | NODE | F. LEFT | F. RIGHT | ON | OFF | UP | DOWN | | |
| | | | 1 | 2 | 3 | 4 | 5 | 6 | 7 | 8 | 9 | 10 | 11 | 12 | 13 | 14 | 15 | 16 | | |
| LOAD CORE STRIP | 00 | 16 | | | | | | | | | | | | | | | | | | |
| MANUAL | 1 | M | • | | | • | | | • | | | | | | | • | | • | 15 | 1 |
| LOWER JAW ON | 2 | 15 | • | | | • | | • | • | | | | | | • | | | • | 17 | 13 |
| BAG AIR ON | 3 | 17 | • | | | • | | • | • | | • | | | | • | | | • | 21 | 9 |
| WELD LEFT & STOP | 4 | 21 | • | | | • | | • | • | | • | | • | | • | | | • | 33 | 11 |
| BAG AIR OFF | 5 | 33 | • | | | • | | • | • | | | | | | • | | | • | 22 | 9 |
| INDEX PRIMARY CARRIAGE OUT | 6 | 22 | • | | | • | • | | • | | | | | | • | | | • | 19 | 5 |
| INDEX 520 LEFT | 7 | 19 | • | | | • | • | | • | | | | | | • | | | • | 13 | 7 |
| INDEX IN | 8 | 13 | • | | | • | | • | • | | | | | | • | | | • | 18 | 6 |
| BAG AIR ON | 9 | 18 | • | | | • | | • | • | | • | | | | • | | | • | 21 | 9 |
| WELD RIGHT & STOP | 10 | 21 | • | | | • | | • | • | | • | | | • | • | | | • | 20 | 12 |
| BAG AIR OFF | 11 | 20 | • | | | • | | • | • | | | | | | • | | | • | 22 | 9 |
| PRIMARY CARRIAGE DOWN | 12 | 22 | | • | • | | | • | • | | | | | | • | | | • | 14 | 2 |
| WELD NODES & STOP | 13 | 14 | | • | • | | | • | • | | | • | | | • | | | • | 30 | 15 |
| LOWER JAW OFF | 14 | 30 | | • | • | | | • | • | | | | | | | • | • | | 16 | 14 |
| LOAD CORE STRIP | 15 | 16 | | | | | | | | | | | | | | | | | | |
| MANUAL | 16 | M | • | | • | | | • | • | | | | | | | • | • | | 15 | 1 |
| LOWER JAW ON | 17 | 15 | • | | • | | | • | • | | | | | | • | | • | | 17 | 13 |
| BAG AIR ON | 18 | 17 | • | | • | | | • | • | | • | | | | • | | • | | 21 | 9 |
| WELD LEFT & STOP | 19 | 21 | • | | • | | | • | • | | • | | • | | • | | • | | 33 | 11 |
| BAG AIR OFF | 20 | 33 | • | | • | | | • | • | | | | | | • | | • | | 22 | 9 |
| INDEX PRIMARY CARRIAGE OUT | 21 | 22 | • | | • | | • | | • | | | | | | • | | • | | 19 | 5 |
| INDEX 520 RIGHT | 22 | 19 | • | | • | | • | | | • | | | | | • | | • | | 12 | 8 |
| INDEX IN | 23 | 12 | • | | • | | | • | | • | | | | | • | | • | | 18 | 6 |
| BAG AIR ON | 24 | 18 | • | | • | | | • | | • | • | | | | • | | • | | 21 | 9 |
| WELD RIGHT & STOP | 25 | 21 | • | | • | | | • | | • | • | | | • | • | | • | | 20 | 12 |
| BAG AIR OFF | 26 | 20 | • | | • | | | • | | • | | | | | • | | • | | 22 | 9 |
| PRIMARY CARRIAGE DOWN | 27 | 22 | | • | | • | | • | | • | | | | | • | | | • | 14 | 2 |
| WELD NODES & STOP | 28 | 14 | | • | | • | | • | | • | | • | | | • | | | • | 31 | 16 |
| LOWER JAW OFF | 29 | 31 | | • | | • | | • | | • | | | | | | • | | • | 16 | 14 |
| REPEAT | | | 7 | | 5 | | 4 | | 6 | | CYLINDER | | | | 3 | | 1 | | | |

APPARATUS FOR FABRICATING AND WELDING CORE REINFORCED PANEL

BACKGROUND OF THE INVENTION

Repeated attempts have been made in the prior art to provide a machine or apparatus capable of successfully welding the face sheets of a panel which incorporates a metallic core to said core.

Numerous machines and methods have been disclosed in the prior art but the most commercially successful machines and apparatus known to the applicants are disclosed in Campbell U.S. Pat. Nos. 3,689,730; 3,598,953; 3,077,532; 3,015,715; and 2,930,882. The various embodiments of the machines and apparatus disclosed in the aforementioned patents revolve around the concept that the weldment of securement portions of core strips to inner surfaces of cooperating face sheets to fabricate a metallic panel is accomplished by the utilization of externally positioned, movable welding rollers or wheels which cooperate with rigid projection welding bars or electrodes disposed internally of the core strips and face sheets.

As previously mentioned, considerable commercial success has been achieved by the utilization of the Campbell apparatus and machines in fabricating stainless steel and titanium core reinforced metallic panels. However, the utilization of the relatively massive welding wheels and rollers in conjunction with the rigid projection welding electrodes entails the flow of welding potential through the relatively thick face sheets into the relatively thin securement portions of the core strips to create a welding current path with the relevant projections of the projection welding electrodes. Consequent upon such techniques and inherent in the utilization of the prior art machines and apparatus has been the necessity for high pressures on the order of 20,000 psi to 30,000 psi and high amperage currents on the order of 2000-6000 amps peak.

The welding wheels of the prior art contact the outer surfaces of the face sheets and sequentially distribute the electric pulses to the face sheets as they traverse the panel width, but all the projections on the welding electrodes are in electrical contact with the core securement portions and the inner surfaces of the face sheets with the result that large amounts of weld current are bypassed through the zones not being welded and large pressures are required in the zone being welded in order to define the weld zone.

Stainless steel and titanium core reinforced panels manufactured on the prior art Campbell machines have been widely and successfully utilized in the aircraft industry in applications where high temperatures and sonic fatigue have been encountered, such as thrust reverser doors for jet engines. However, the prior art panels are characterized by the presence of welding "nuggets" of excessive size due to the high pressures and the relatively high amperages which must be utilized to project the welding potential through the relatively thick face sheets and through the relatively thin securement portions of the core strips to create a weld zone with the projections of the rigid projection welding bar that react against the massive welding wheel pressure, while other projections bleed off welding current.

It is characteristic of prior art panels that a conspicuously perceptible welding pattern may be discerned across the external surfaces of the face sheets, said welding pattern being attributable to the excessive weld nugget size created by the previously mentioned pressure-amperage parameters encountered in the utilization of the prior art apparatus.

We have found that, from a physical and structural analysis of the prior art panels, there is absolutely no necessity for the utilization of the high pressures and high amperages entailed by the prior art apparatus or machines to securely fasten the securement portions of the core strips in welded and operative relationship with the interior surfaces of the face sheets. Additionally, the prior art apparatus or machines limit the thickness of the face sheets that may be used.

As a matter of fact, physical experiments have demonstrated that a series of relatively small weldments is capable of achieving the permanent affixation of the securement portions of the core strips in operative engagement with the internal surfaces of the cooperating face sheets.

Surprisingly enough, we have also found that, as the size of the welding "nuggets" is reduced, it is possible not only to create a greater number of weldments in a series but to achieve structural characteristics in the panel not attainable by the use of prior art welding machines subjected to the inherent demands of pressure and amperage previously described.

Of course, the prior art machines cannot be utilized to fabricate panel by the generation of the limited welding current pulses and pressures necessary to curtail the size of the "nuggets" or weldments which have been the subject of our experimental endeavors. Consequently, we have invented a machine or apparatus as succinctly set forth in the preceding abstract of the invention and disclosed hereinbelow.

OBJECTS AND ADVANTAGES OF THE INVENTION

An object of our invention is the provision of a welding apparatus for a panel as described above which is characterized by the fact that it is capable of creating a series of internally generated, relatively small weldments which will secure the securement portions of the core strips in operative engagement with the internal surfaces of the cooperative face sheets.

An object of our invention is the provision of an apparatus utilizing internally generated and electrically isolated weldments to secure the securement portions of the core strips in operative engagement with the internal surfaces of the cooperative face sheets when the face sheets are very thick relative to the maximum thickness that prior art apparatus can accommodate. The face sheet thickness usable in our invention is limited only by handling of the face sheet material, not by the welding process. For example, prior art face sheets are limited to about 0.040 inch stainless alloys and our invention can join core securement members to face sheets at least 0.160 inches thick.

Another object of our invention is the provision of an apparatus of the aforementioned character in which a first welding head is provided which is capable of generating and internally impressing a series of welding pulses on the adjacent securement portions of a relevant core strip to weld the core strip internally of the cooperating face sheets. Consequently, the welding potential, in contradistinction to that generated and impressed by prior art apparatus, focuses internally of the panel being fabricated and must only be of a magnitude sufficient to adequately penetrate the relatively thin securement portions of the core strips and a sufficient depth of the adjacent areas of the face sheets because each weldment is created in an electrically isolated fashion and there is no surplus current or pressure required.

Therefore, the mass of the weldments can be tailored to the structural requirements of the panels and numerous small weldments embraced within a series of weldments can be provided in substitution for the needlessly large weldments of prior art apparatus and methods. Concomitant with the significant reduction in the size of the weldments because of the internal and isolated generation thereof, is the reduction of welding amperage and pressures entailed by the use of prior art machines and apparatus. The forces exerted by the individual welding electrodes have been reduced, for example, to four pounds and the amperage of the welding current to 200–500 amps, with R.M.S. depending upon pulse duration.

However, if the generation of larger weldments is desired, they can be achieved by increasing the welding current and, if necessary, the size of the welding electrodes.

Significant benefits achieved by the machine or apparatus of our invention are panels whose external surfaces are not defaced by the conspicuous welding patterns of the prior art and whose physical characteristics are greatly enhanced by the elimination of stress risers resulting from the excessively large weldments produced by the utilization of prior art apparatus and methods.

Disclosed in our co-pending applications for U.S. Letters Patent Ser. No. 948,011, entitled Core Strip Blank, Core Strip and Method of Making Same, filed Oct. 2, 1978 and Ser. No. 948,012 entitled Metallic Core Panel and Method of Making Same, filed Oct. 2, 1978 are core strip and panel structures and methods of fabricating the same which are peculiarly well adapted to fabrication by the machine and apparatus of our invention.

Another object of our invention is the provision of an apparatus for welding core-type metallic panel which incorporates adjustment means whereby the apparatus can be adjusted to fabricate different thicknesses of panel without the expenditure of time required by prior art means to manufacture different thicknesses of panel.

A further object of our invention is the provision of an apparatus of the aforementioned character in which there is incorporated a first welding head, said welding head having oppositely movable jaws mounted thereupon and being insertable into and removable from the space between the face sheets so that internal welding of the core strips and resultant core structure in operative engagement with the face sheets can be accomplished.

An additional object of our invention is the provision of an apparatus of the aforementioned character in which the oppositely movable jaws of the welding head have welding electrode means demountably secured thereto so that, as individual welding electrodes are subjected to the attrition process commonly encountered in welding, they may be individually removed and replaced expeditiously.

Another object of our invention is the provision of a plurality of electrode housings, cassettes or modules which incorporate receptacle means for a plurality of welding electrodes and which are demountably secured to the associated jaws so that, when the electrode attrition occurs, only those modules, cassettes or housings which have worn electrodes therein need be removed from operative engagement with the associated jaws.

Another object of our invention is the provision of welding electrode means constituted by a plurality of separate fingers which are initially urged into engagement with contiguous areas of the securement portions of the core strip by the opposite movement of the jaws upon which they are mounted and wherein said fingers are resilient so that, during the weld melt phase, they will follow the molten metal to complete the welding operation. We have determined that the fingers disclosed herein will, when urged against the securement portions with a force of 3 pounds, remain in contact with said securement portions if these portions are moved away from the fingers at a rate of 0.004 inches in 1/6 of a millisecond. As the weld pulse lasts from 1 to 3 milliseconds, our fingers are always in proper contact with the weld zone.

Another object of our invention is to vastly increase the useful life of the welding electrodes and to eliminate entirely the constant "in process" adjustments of the prior art electrode strips necessitated by Brinelling of the projections due to excess heat and pressure. For example, we have found that several thousand core strips can be welded to the face sheets without changing the internal electrodes and without any adjustments, and the panel quality is still excellent. With prior art techniques, the rigid projection welding electrode bars have to be adjusted about every ten core strips in order to maintain panel thickness, and replaced every 100 to 400 core strips because the projections have been flattened down and enlarged to the point of uselessness.

Another object of our invention is the provision of an apparatus of the aforementioned character wherein first and second welding heads are provided, the first welding head being movable internally into the space between the face sheets and having individual welding electrodes thereupon to weld the securement portions of the core strip to the inner surfaces of the face sheets and said second welding head being insertable into the aforesaid space after the welding operation of the first welding head has been completed so that contiguous portions of the webs of the core strips may be secured to one another.

An additional object of our invention is the provision of an apparatus for welding core-reinforced metallic panels which includes a first welding head of the aforementioned character, said first welding head welding electrode means being indexable with said first welding head to create first, second and, if desired, a third series of weldments which are interspersed among one another to cause a continuous line of internally generated and electrically isolated weldments to be created between the securement portions of the core strips and the inner surfaces of the face sheets.

A basic object of our invention is to comply with the best interests of our nation and the world in the areas of energy conservation, natural resources conservation and protection of the environment. The prior art Campbell equipment uses large amounts of electrical power, large amounts of de-ionized cooling water under high pressure (which is dumped down the sewer), and as the finished panels are full of water, it is necessary to use large amounts of power to operate drying ovens to remove the water from the panels. The present invention uses no cooling water, a fraction of the power to fabricate panel, and no high pressure pumps or drying ovens to consume power.

A further object of our invention is the provision of an apparatus incorporating a first welding head of the aforementioned character which incorporates electrode means operatively connected to a polyphase source of welding potential and pulse generating means connected between said welding electrodes and said source to impress successive welding pulses on said electrode means.

Prior art (Campbell) apparatus will not function on three phase power due to lack of cool time between pulses and large magnitude of pulses. Thus, prior art machines use three phase motors to drive single phase generators of at least 100 KVA capacity. The present invention provides excellent results with as little as 7½ KVA of three phase power due to electrically isolated welds wherein each phase can perform individually.

A further object of our invention is the provision of welding cassettes which consist of housings having a plurality of receptacles therein for mounting individual electrodes, said welding cassettes being demountably secured in operative relationship with an associated welding head so that, when one or more electrodes become inoperative, the cassette containing the same can be removed without affecting the operative relationship of the other cassettes with the welding head.

An additional object of our invention is the provision of an apparatus of the aforementioned character wherein the individually movable welding electrodes of the second welding head are connected to a source of three phase welding potential and the source of welding potential has pulse generating means connected thereto whereby successive welding pulses are impressed upon said individually movable electrode means. Three phase power is the most efficient and commonly used form of AC power.

Another object of our invention is the provision of selected welding electrode fingers for the first welding head whereby a different welding potential impressed on said fingers will result in different current flow at the tips thereof.

A further object of our invention is the provision of an apparatus of the aforementioned character wherein selected welding electrodes may have a higher welding potential impressed thereupon than others of the welding electrodes whereby selected welding performance of the electrodes may be achieved. For instance, the increased thickness of a core securement portion in a particular area of the panel may indicate a need for increased welding current on specific electrodes which are welding the thicker securement portions of the core strips to said face sheet.

A further object of our invention is the provision of an apparatus of the aforementioned character wherein automatic welding control means is provided to accomplish the impressing of increased welding potential upon selected welding electrodes and whereby the selected electrodes can be established in a desired location among the bank of electrodes to accomplish the aforementioned impression of a greater welding potential thereupon.

Another object of our invention is the provision of infinitely adjustable tip pressure for the electrodes of said second welding head that weld the nodal columns of the webs of the core strips together and the concurrent provision of follow-up for the tips during the weld period as a result of manifolding controllable air pressure to the pistons on each tip actuator. Prior art apparatus uses spring loaded tip actuators wherein the light tip welding force (say 3 pounds) combined with substantial travel requires use of coil springs with many turns (35 to 55) and this type of spring "surges" under fast cycling conditions causing tip bounce and variable tip force.

Further objects and advantages of the invention will be apparent from the following specification and the accompanying drawings which are for the purpose of illustration only.

BRIEF DESCRIPTION OF THE DRAWINGS

FIG. 6 is a view similar to FIG. 5 showing the first carriage and the welding electrode means mounted thereupon in operative position;

FIG. 7 is a fragmentary view of a portion of FIG. 6 showing the manner in which the throat jaw of the apparatus engages the lower face sheet;

FIG. 8 is a view taken on the line 8 of FIG. 7 and is an enlarged fragmentary view illustrating the impingement of the welding electrode fingers in operative relationship with the securement portions or flanges of a core strip and the creation of welds between said securement portions of said core strip and the associated face sheets of the panel being fabricated in the apparatus;

FIG. 19 is an enlarged isometric view of a typical welding cassette having a plurality of welding electrode fingers mounted therein;

FIG. 20 is an isometric view illustrating the piston rod and associated demountable welding electrode tip utilized for a purpose described in greater detail hereinbelow;

FIG. 21 is an enlarged fragmentary partly sectional, front elevational view taken from the broken line 21—21 of FIG. 3;

FIG. 22 is a side plan view taken from the broken line 22—22 of FIG. 21 illustrating a bank of welding electrode fingers on said second welding head;

FIG. 23 is an enlarged sectional view illustrating the mechanism for advancing and retracting a typical welding electrode tip with the tip in the advanced position taken from the broken line 23—23 of FIG. 22;

FIG. 24 is a view similar to FIG. 23 with the tip in the withdrawn or retracted position;

FIG. 28 is an enlarged fragmentary sectional view taken from the broken line 28—28 of FIG. 2;

FIG. 29 is a vertical sectional view taken from the broken line 29—29 of FIG. 28;

FIG. 31 is a logic chart showing the sequences of operation of various components of the apparatus; and FIG. 32 is a block diagram showing various components of the welding circuitry.

DESCRIPTION OF PREFERRED EMBODIMENT OF APPARATUS

The apparatus 10 of the invention, as best shown in FIGS. 1–8 and 13–30 of the drawings, includes a supporting frame 12 consisting essentially of a supporting base 14 for side mounting plates 16 from which the various components of the apparatus are supported or suspended.

Figure 3:
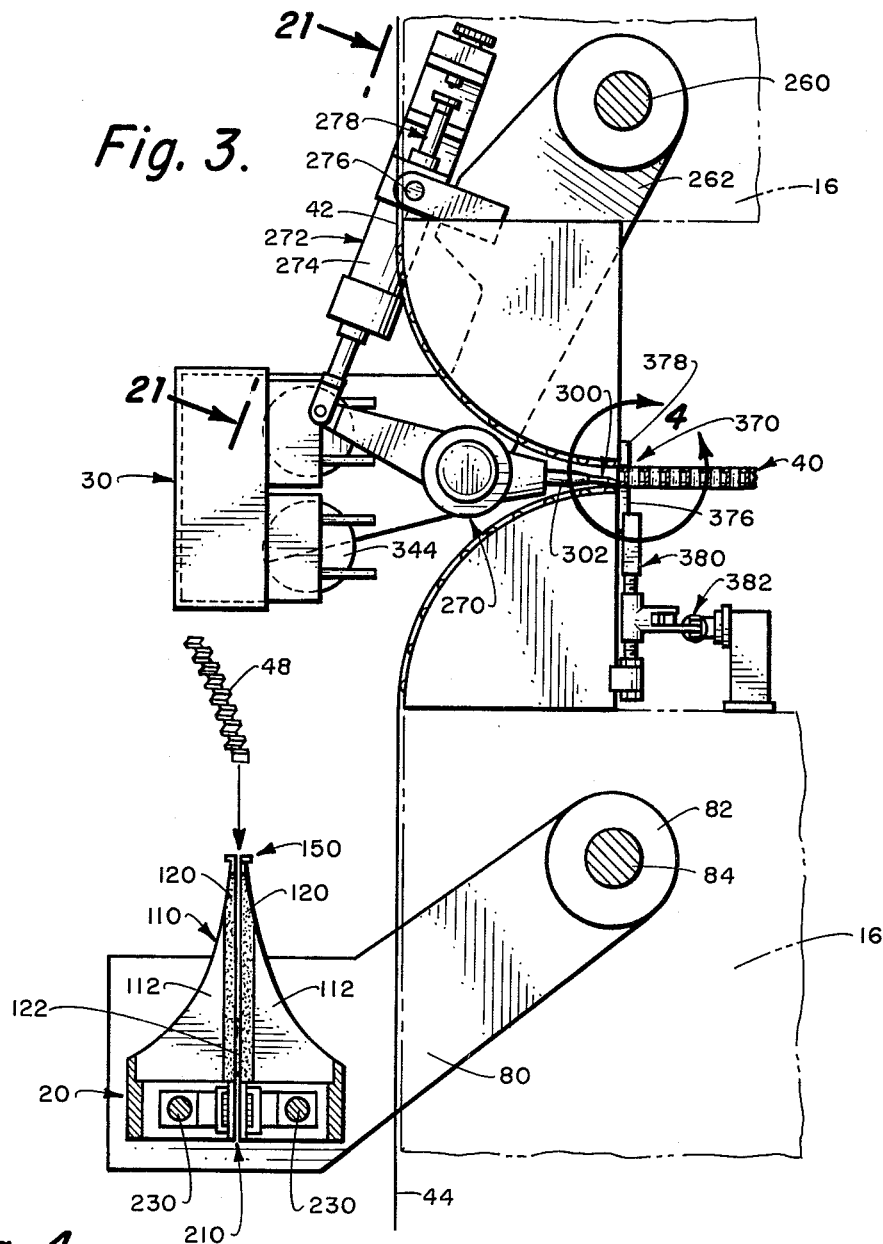
FIG. 3 is an enlarged fragmentary sectional view showing the first and second carriages of the apparatus taken on the line 3—3 of FIG. 1.
Figure 4:
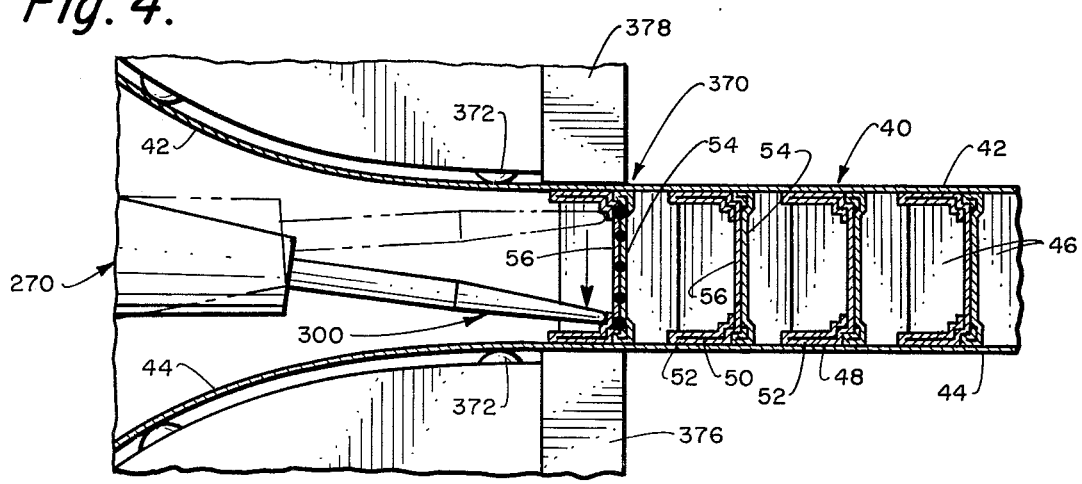
FIG. 4 is an enlarged fragmentary sectional view taken on the line 4 of FIG. 3.

The apparatus 10 includes first and second carriages 20 and 30, as best shown in FIGS. 3–8 of the drawings and, as will be described in greater detail hereinbelow, the first carriage 20 cooperates with the second carriage 30 in welding a panel 40 which, as best shown in FIG. 4 of the drawings and as more fully described in the above-referenced co-pending applications, includes face sheets 42 and 44 which define a cavity 46 between the spaced confronting inner surfaces thereof for the reception of core strips 48 having securement portions 50 constituted by projecting flanges 52 which are welded in operative relationship with the face sheets 42 and 44 to constitute the resultant panel 40.

Although reference has been made in detail to the co-pending applications which relate respectively to the core strip and core strip blank and to the construction of the panel and the method of fabricating the same, to facilitate consideration of the apparatus in both its structure and mode of operation, the panel 40 is further described as being of honeycomb core configuration, that is, the nodal areas 54 and 56 of the core strips are juxtaposed to one another and the flanges 52 are internested at the nodal areas to provide the honeycomb core configuration and secure the numerous structural advantages of the honeycomb core panel 40 adverted in detail in the co-pending applications.

The face sheets 42 and 44, respectively, are fed from an upper roll or drum 60 and a lower roll or drum 62. It will be noted that the face sheets 42 and 44 are of relatively narrow width in relationship to the width of the drums 60 and 62. Normally, face sheets of greater width would be fed from the associated drums but face sheets 42 and 44 of relatively narrow width have been shown so that the various components of the apparatus which would normally be obscured thereby may be readily perceived. However, it will be understood by those skilled in the art that the apparatus can be utilized to manufacture panel whose width is at least as great as the width of the drums 60 and 62.

Mounted in the surface of each of the drums or rolls 60 and 62 is a series of fasteners 64 which are engageable with corresponding openings, not shown, in the ends of the face sheets 42 and 44 reeled upon the drums 60 and 62 to maintain tension upon the face sheets 42 and 44 in cooperation with hydraulic brake motors 66 which are connected to the shafts 68 upon which the drums 60 and 62 are mounted for rotation, in a manner to be described in greater detail below.

The end of the panel 40 issuing from the apparatus 10 is secured to a movable yoke 70 by means of fasteners 72, said yoke 70 being supported from parallel guide tubings 74 in a manner to be described in greater detail hereinbelow. Although the yoke 70 can be advanced on the guide tubings 74 by being pushed along by means of the issuance of the panel 40 in increments, it may be desirable in certain applications, such as relatively wide panels, to provide a motor which can pull the yoke 70 along the guide tubings 74 to insure that the tension between the rolls 60 and 62 and the brake motors 66 thereof as exerted upon the face sheets 42 and 44 may be maintained. The maintenance of tension is of extreme importance because of the necessity for maintaining the face sheets 42 and 44 in the optimum flat, parallel condition during the fabrication of the panel 40.

In order to facilitate the consideration of the various components of the apparatus 10 and the operation thereof, the components and subassemblies of the apparatus 10 will be described under separate headings.

THE FIRST WELDING CARRIAGE 20

The first welding carriage 20, as best shown in FIGS. 1 and 3–16 of the drawings, includes a pair of mounting arms 80 located at opposite sides of the apparatus and fixedly secured by bosses 82 to a transversely oriented rotatable shaft 84. The mounting of the carriage 20 by means of the arms 80 to the rotatable shaft 84 causes rotation of said shaft to be communicated to the carriage 20 so that it may be moved between the inserted position shown in FIG. 6 of the drawings and the withdrawn, loading position shown in FIG. 3 of the drawings. The operative relationship between the carriage 20 and drive shaft 84 therefor also facilitates the movement of the carriage in a variety of other senses but the major movement accomplished by the operative relationship between the drive shaft 84 and the carriage 20 is that referred to immediately hereinabove.

Figure 2:
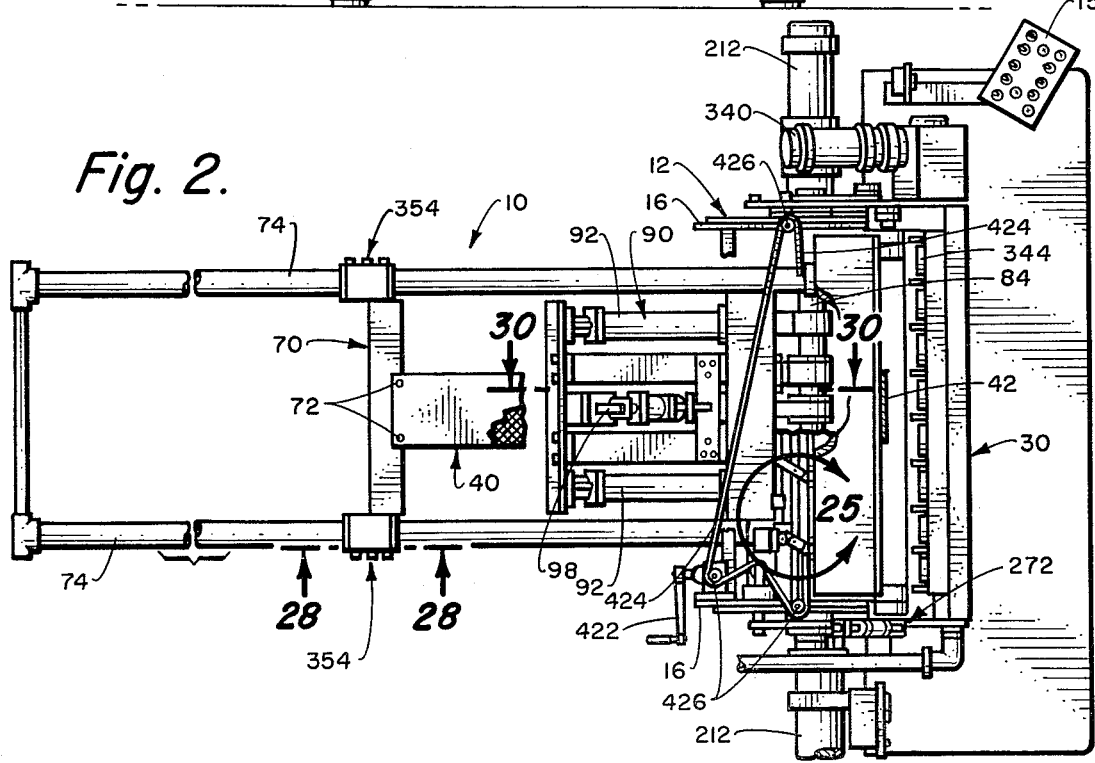
FIG. 2 is a top plan view of the apparatus taken from the broken line 2—2 of FIG. 1.
Figure 30:
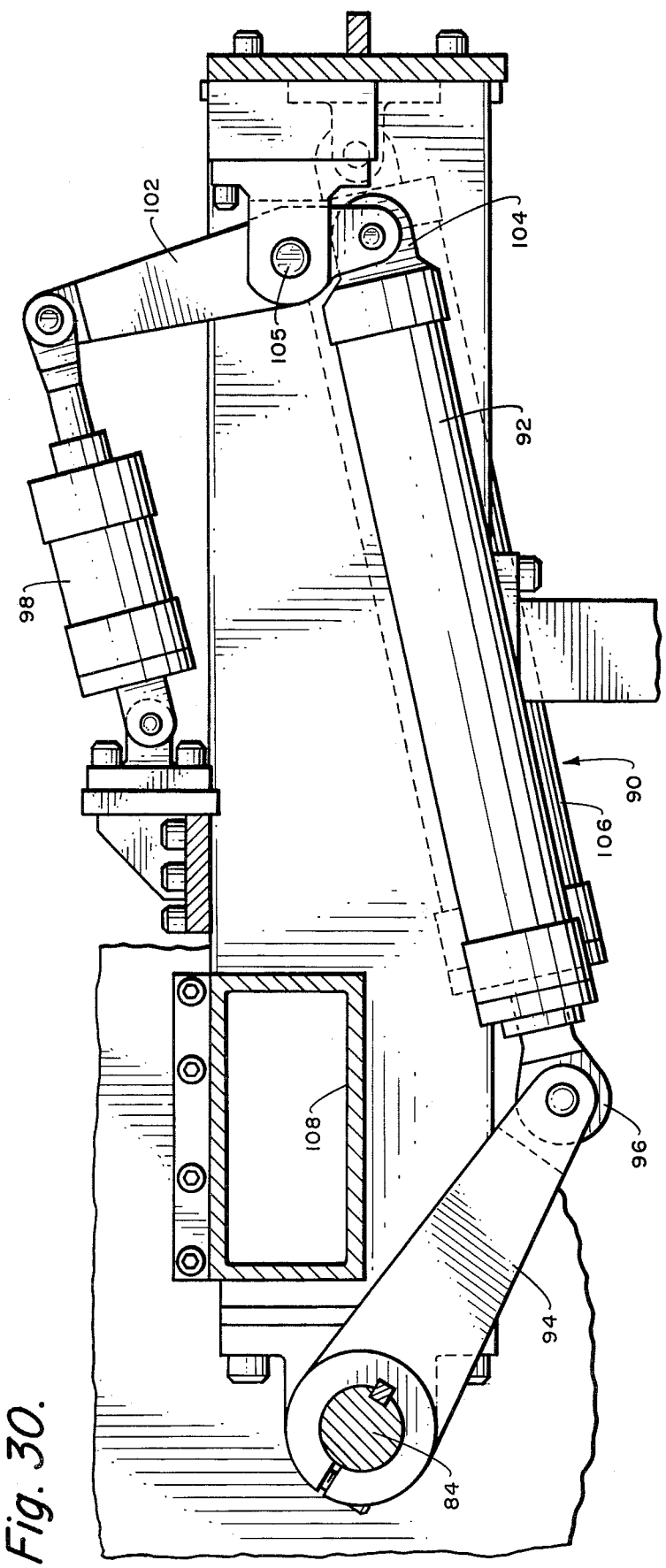
FIG. 30 is an enlarged fragmentary, partly sectional view taken from the broken line 30—30 of FIG. 2.

The actuating assembly for causing the rotation of the drive shaft 84 is indicated generally at 90 in FIGS. 2 and 30 of the drawings, said actuating assembly consisting of a pair of hydraulic cylinders 92 each of which connected to the shaft 84 between opposite extremities thereof by means of a lever 94 which, in turn, is pivotally connected to the piston rod 96 of the hydraulic cylinder 92. Consequently, when the hydraulic cylinder 92 is actuated from a source of hydraulic fluid, in this case, a hydraulic pump interposed in a line from a hydraulic reservoir, not shown, extension of the piston rod 96 will cause clockwise rotation of the lever 94 and concomitant rotation of the shaft 84, simultaneously causing the rotation of the first carriage from the lower, loading or inoperative position of FIG. 3 into the inserted, operative position of FIG. 6.

Conversely, when the piston rod 96 is withdrawn into the cylinder 92 the lever 94 is rotated in a counterclockwise direction resulting in counterclockwise movement of the shaft 84 and movement of the carriage 20 from the inserted operative position of FIG. 6 to the withdrawn loading position of FIG. 3.

Also incorporated in the actuating assembly for the shaft 84 of the first carriage 20 is an auxiliary hydraulic cylinder 98 which, as best shown in FIG. 30 of the drawings, is pivotally connected to an actuating lever 102 which in turn is pivotally connected to the extremity 104 of the housings of each of the hydraulic cylinders 92. The actuating lever 102 is pivotally mounted intermediate its extremities at 105. Consequently, when the hydraulic cylinders 92 of the actuating assembly 90 are operated, the pivotal connection of the lever 102 to the housing 104 of each hydraulic cylinder 92 constitutes a fulcrum about which the housing 104 pivots to permit the rotation of the lever 94 by the piston rod 96.

There is a need for movement of the first carriage 20 to an intermediate position between the maximum inserted position and the maximum withdrawn, loading position to permit lateral shifting of the first carriage 20 in a manner to be described in greater detail below. In other words, when the first carriage 20 is in the upper, inserted, welding position as best illustrated in FIG. 6 of the drawings, various components operatively associated with the first carriage 20 are engaged upon corresponding portions of the panel 40 which is being manufactured and it is necessary to withdraw those components by movement of the welding carriage 20 to an intermediate position by the auxiliary cylinder 98 so that lateral shifting of the carriage 20 can be accomplished, in a manner to be described in greater detail below.

This avoids the necessity for movement of the carriage 20 from maximum inserted and withdrawn positions since a relatively minor increment of movement of the carriage 20 to the intermediate position accomplishes the desired withdrawal of the welding components on the welding carriage from operative engagement with corresponding portions of the panel 40 being welded and this intermediate movement can be accomplished in a relatively shorter time than the major movement between opposite extremities of movement of the carriage 20.

Also encompassed in the actuating assembly 90 is a pair of pneumatic cylinders 106, only one of which is shown in FIG. 30 of the drawings, said pneumatic cylinders acting as air aprings to cushion the movement of the shaft 84 by the hydraulic cylinders 92 and 98 and to reduce the load on said hydraulic cylinders. An air reservoir 108 connected to the pneumatic cylinders 106 by appropriate conduits, not shown, facilitates the functioning of the air springs 106.

Although hydraulic and pneumatic operation of the shaft 84 for the first carriage 20 is utilized in the preferred embodiment of the apparatus 10 it will, of course, by obvious to those skilled in the art that there is a wide range of mechanisms which could be utilized in substitution for the specific assembly of actuating components shown and it is not intended that the scope of the invention be limited to specific elements of the actuation assembly 90 since electric motors and other types of driving devices could be utilized with equal success in substitution for the hydraulic-pneumatic motors disclosed specifically herein.

THE INTERNAL WELDING MEANS FOR THE CORE STRIP SECUREMENT PORTIONS

The basic function of the first carriage 20 is to support and transport between and into the various positions which have been disclosed above and which will be described hereinafter welding means 110 for accomplishing the internal weldment of the securement portions 50 of the core strips 48 of the panel 40 in welded and operative relationship with the face sheets 42 and 44 and with each other, all as generally shown in FIGS. 6–18.

The internal welding means 110 consists of two movable jaws 112 which are mounted on the carriage 20 and which are adapted to be conveyed thereby between the various positions disclosed and shown. The jaws 112, as best shown in FIGS. 13–18, are mounted for lateral movement on the carriage bed 114 in modes toward or away from each other in a manner to be described in greater detail below.

Figure 13:
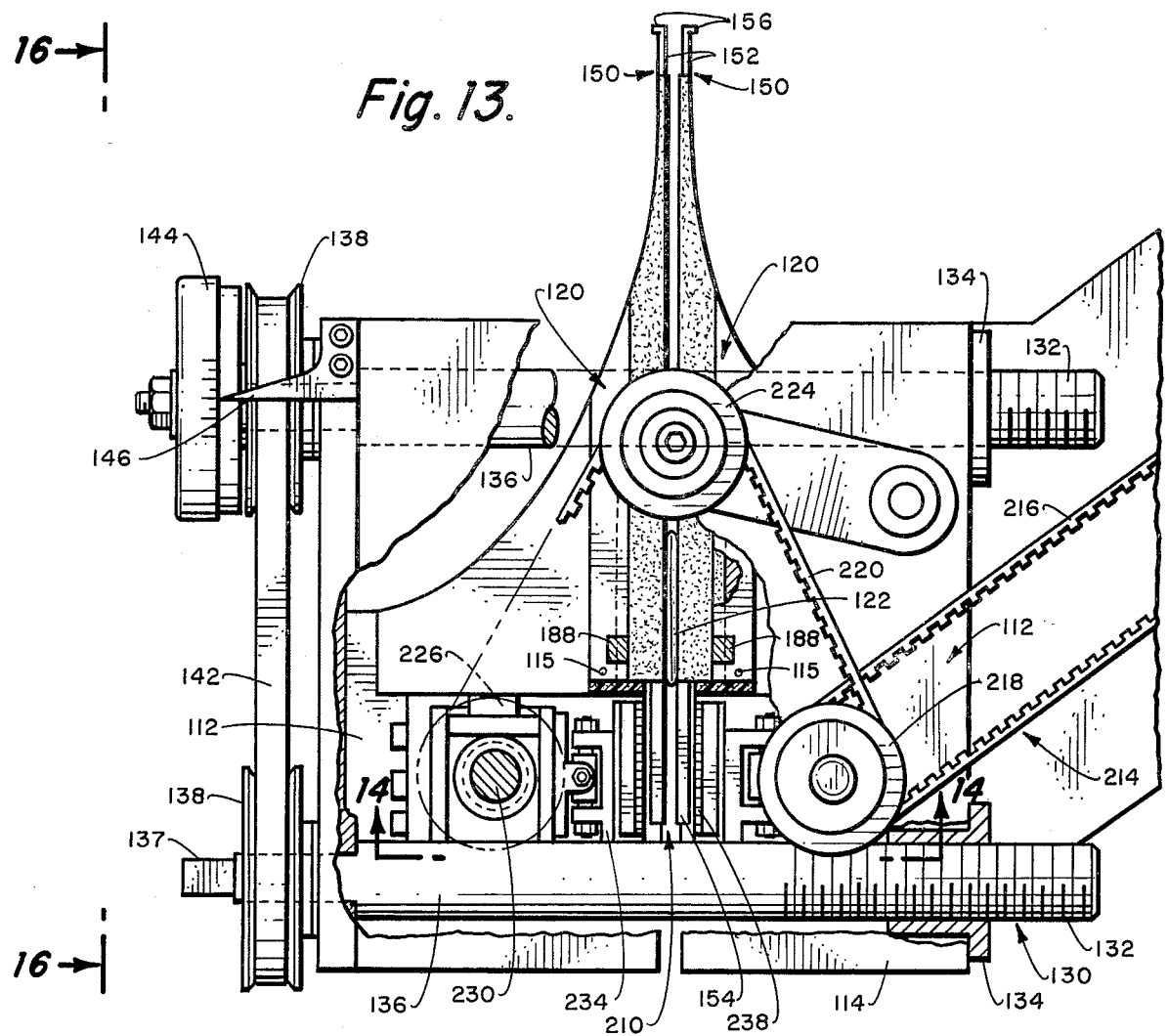
FIG. 13 is an enlarged fragmentary sectional view taken on the broken line 13—13 of FIG. 1 and illustrating the adjustment mechanism for determining the initial spacing of the jaws which mount the welding electrode fingers.

Pivotally supported on the jaws 112 by pivot pins 115, FIG. 13, are jaw members 120, said jaw members being movable within prescribed limits by the expansion of air bags 122 which are interposed between confronting faces of the jaw members 120 and jaws 112. The jaw members 120 are normally urged into their closest juxtaposition on the jaws 112 by means of torsion or similar springs, not shown.

Consequently, there are two adjustments encompassed in the jaw structures, the major movement of one of the jaws 112 toward or away from the other jaw which may be fixed, as it is in the present construction, or which may be simultaneously laterally movable with its associated jaw and the minor or relatively minor but

11 equally important pivotal movement of the jaw members 120.

THE ADJUSTMENT MEANS FOR THE JAWS 112

The adjustment means 130 for laterally adjusting one of the jaws 112, in this case the right hand jaw, with reference too the left hand jaw 112, includes upper and lower adjustment screws 132 threadedly engaged in correspondingly threaded bushings 134. The screws 132 are mounted in opposite extremities of the jaws 112 and have unthreaded portions 136 which extend through correspondingly unthreaded bores and have projecting spud portions 137 for the reception of drive sheaves 138 having drive belts 142 entrained thereupon.

Mounted on the spud portion of the upper screw 132 is a micrometer head 144 which is cooperative with an index 146 for adjusting the movable jaw 112 toward or away from the corresponding fixed jaw. Consequently, the major adjustment of the jaws 112 to determine the spatial relationship therebetween is accomplished by the use of the adjustment means and the utilization of the micrometer head 144 and index 146 to accurately determine the aforesaid spatial relationship and to eliminate the necessity for time consuming and cumbersome hand adjustment of the jaws with reference to each other by the use of external tools, or the like.

PIVOTAL ADJUSTMENT OF JAW MEMBERS 120

The air bags 122 are used to accomplish pivotal adjustment of the jaw members 120 after the initial spatial relationship of said jaw members with reference to each other has been determined by adjustment of the jaws 112 by the utilization of the adjustment means 130 therefor in the above described manner.

The air bags 122 are provided to accomplish a plurality of subsequent adjustment steps which are smaller in magnitude but which are of equal importance to the initial major adjustment accomplished by the adjusting means 130. While we have disclosed the utilization of an air bag to accomplish these precise adjustments, it will be obvious to those skilled in the art that a variety of alternate means, mechanical, electrical, pneumatic or hydraulic, could be utilized in substitution therefor with equal efficacy. However, we have found that the air bag 122 constitutes a simple expedient which is capable of achieving the necessary smaller magnitude adjustments necessary to accomplish the adjustment of the jaw members 120.

Moreover, although we have disclosed the pivotal mounting of the jaw members 120 to accomplish the adjustment thereof in relationship to each other, it will also be obvious to those skilled in the art that the jaw members 120 could be slideable or otherwise mounted upon the jaws 112 to accomplish the mutual adjustment thereof and, thus, achieve the desired ends which will be adverted to in detail hereinbelow.

When the primary or first carriage 20 is located in the lowermost position in which it is withdrawn from operative engagement with the components of the panel 40 being fabricated, the new core strip 48 to be welded in operative relationship with the face sheets 42 and 44 is deposited on the welding electrode means 150 which will be described in greater detail below.

After the core strip 48 is deposited upon the welding electrode means 150, the welding cycle of the apparatus 110 is initiated by pressing a button on the control panel 154, FIG. 2, and the air bags are expanded to their first, holding stage under relatively low pressure in which they bias the welding electrode means 150 into operative engagement with the securement portions 50 of the core strips 48 to maintain the core strip 48 in operative and mounted relationship with the welding electrode means 150 as the primary carriage 20 is moved clockwise by the rotation of the actuating shaft 84 into the operative upper, welding position of FIG. 6 of the drawings.

When the welding electrode means 150 have been carried into the operative position in which they are disposed internally of the face sheets 42 and 44 in the cavity 46 defined by the confronting inner surfaces of said face sheets and in juxtaposition to the securement portions 50 of the core strips 48 constituted by the angularly disposed flanges 52 thereof, the air bags are subjected to a second stage increased pressure which biases the welding electrode means 150 away from one another through pivotal outward movement of the jaw members 120 causing the electrode means to firmly engage the securement portions 50 of the core strips 48 and to ultimately create a series of weldments between said core strips and the face sheets 42 and 44.

In illustrating the construction and mode of operation of the apparatus 10, it is disclosed as manufacturing a honeycomb core reinforced panel such as that disclosed in our above-referenced, co-pending application. However, it will be apparent that the teachings of the present apparatus can be applied to other types of panels having different core configurations and it is not necessary that the cores be of honeycomb configuration.

THE WELDING ELECTRODE MEANS

As previously indicated, the welding electrode means 150, which will hereinafter be referred to variously as welding electrode means, flange welding means, securement portion welding means, internal welding means and the like, is supported, ultimately, on the individual pivotally mounted jaw members 120.

The construction and mode of operation of the welding electrode means are illustrated in FIGS. 5-18 of the drawings and, as best shown in FIGS. 8-12 and 13, 16-19, the welding electrode means 150 includes a plurality of elongated welding electrode fingers 152 which may be formed of any suitable conductive material, such as chromium copper or the like, and each of which is characterized by the fact that it includes an elongated, rectangular body 154, FIG. 19, and a forward extremity having an integrally formed, generally cylindrical, upstanding welding tip 156 thereupon.

The body 154 of each of the welding electrode fingers 152 is generally of rectangular cross section and a plurality of fingers 152 is mounted in an individual welding finger cassette, housing or container 160, FIG. 19, which, in a manner to be described in greater detail below, is associated with a plurality of identical containers or cassettes 160 mounted in the jaw members 120, as best shown in FIGS. 13-19 of the drawings.

THE WELDING CASSETTES OR CONTAINERS

The individual welding cassettes 160 may be fabricated from a variety of materials including high impact, synthetic resins, such as polycarbonate and the like. When the cassettes 160 are fabricated from synthetic resins, the necessity of electrically isolating the individual fingers 152 from one another is eliminated because of the dieelectric properties of the material.

However, when the cassettes 160 are fabricated from aluminum or other metals, it is necessary to provide a dieelectric coating on the cassette 160 to electrically isolate the individual fingers 152 from electrical communication with one another which would result in the shorting of the welding circuits. In the case of aluminum, certain coatings, such as those produced by anodizing the housings, provide the necessary insulating effect. On the other hand, where metallic cassette bodies are utilized, it is also feasible to provide the individual fingers with a coating of a dieelectric material such as a synthetic resin.

Each of the cassettes 160 includes an elongated body 162 which incorporates a plurality of elongated grooves 164, FIG. 19, with each of said grooves 164 being adapted to receive a correspondingly elongated welding electrode finger 152. As previously mentioned, each of the electrode fingers 152 is electrically isolated from adjacent fingers so that the individual fingers can be subjected to welding current in a seriatim and separate manner to be described in greater detail hereinbelow.

It will be noted that the fingers have their forward extremities incorporating the welding tips 156 projecting therefrom in a predetermined pattern whose relevance will be described in greater detail below and that the rearward extremities thereof project beyond the confines of the housing and are supported by an extension 166 of the cassette housing, FIG. 19.

The individual welding electrode fingers 152 are maintained in their predetermined positions within the cassette 160 by means of securement pins 168 and each cassette is provided with a dovetail 172 for securing the respective cassette in operative relationship with one or the other of the jaw members 120, in a manner to be described in greater detail below.

Figure 17:
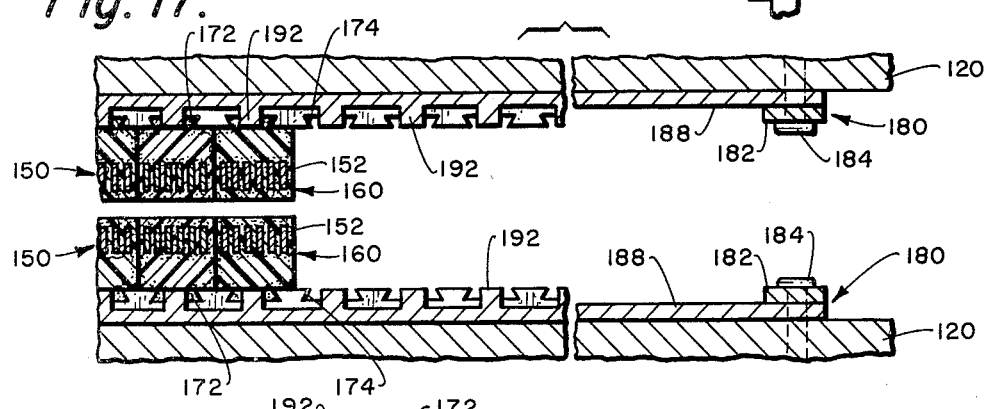
FIG. 17 is a transverse sectional view taken from the broken line 17—17 showing the manner in which the welding cassettes or housings are engaged with the corresponding portions of the associated jaws of the first carriage and, the locking mechanism for the cassettes operating to retain the cassettes in operative relationship with the associated jaws.
Figure 18:
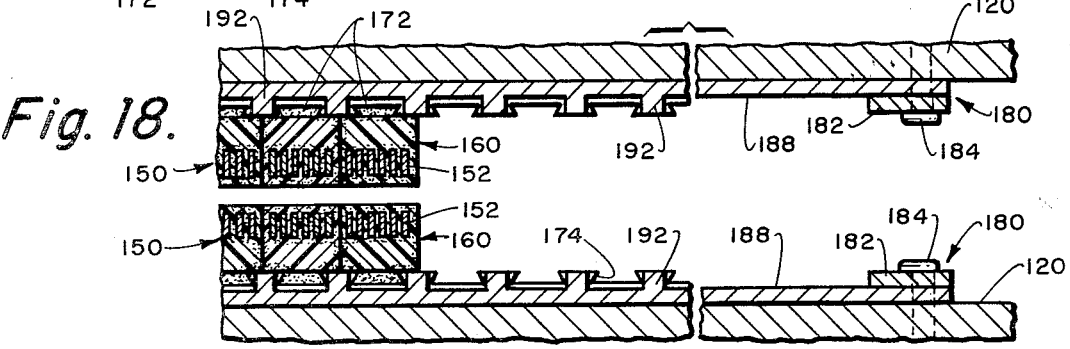
FIG. 18 is a view similar to FIG. 17 and illustrating the locking mechanism in the unlocked position whereby withdrawal of a particular cassette or all of the cassettes can be achieved.

Cooperative with the dovetails 172 on the cassettes 160, is a plurality of correspondingly shaped dovetail grooves 174 which is provided along the length of both jaw members 120, as best shown in FIGS. 17 and 18 of the drawings. The dovetails 172 on the cassettes 160 are slideably engaged in the corresponding dovetail grooves 174 and this mounting construction facilitates the expeditious insertion of the individual cassettes 160 into operative engagement with the individual jaw members 120 and also facilitates the dismounting of one or more cassettes 160 from operative engagement with the respective jaw members 120.

Although tests have indicated relatively minor attrition of the welding electrode fingers 152, when such attrition or other diminution of the effectiveness of the respective fingers 152 occurs, only that cassette 160 incorporating the damaged electrode fingers 152 need be removed. After a cassette 160 has been removed to remove a worn electrode finger 152, an identical cassette 160 can be immediately substituted therefor, thus avoiding the necessity for significant down time in the operation of the apparatus 10.

Figure 16:
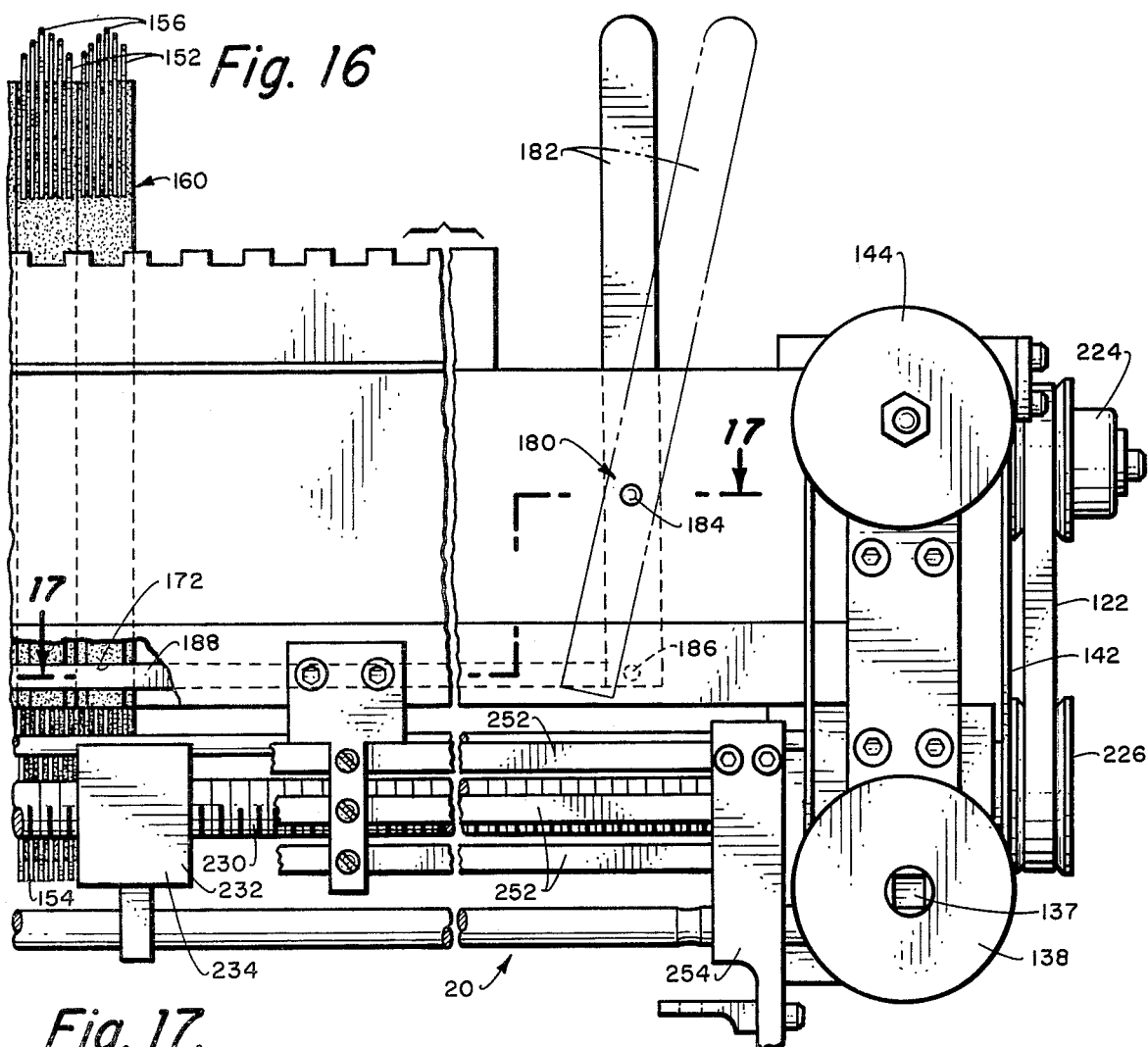
FIG. 16 is an enlarged fragmentary sectional view taken from the broken line 16—16 of FIG. 13 and illustrating the various elements of the welding electrode combination from a front elevational aspect.

In order to retain the cassettes 160 in operative relationship with the jaw members 120, cassette locking means 180 is provided, as best shown in FIGS. 16-18, said locking means including an actuating lever 182 associated with each of the banks of cassettes 160 and pivotally mounted intermediate its extremities at 184, FIGS. 16-18. Each locking lever 182 is pivotally connected at 186 to an elongated locking bar 188, each locking bar 188 having a plurality of detent lugs 192 thereupon adapted to retain the associated cassette 160 in operative engagement with the respective jaw member. The retention of the individual cassettes 160 in operative engagement with the associated jaw members 120 by the locking bars 188 is illustrated in FIG. 17 of the drawings wherein the detent lugs 192 are shown as being disposed in overlying relationship with the dovetails 172 on the cassettes 160.

When the release of one or more cassettes 160 from operative engagement with the associated dovetail grooves 174 is desired, the actuating lever 182 is pivoted about the pivot 184 to cause the respective locking bar 188 to be shifted laterally and to move the detent lugs 192 thereof out of registration with the dovetails 172 of the cassettes 160. When this occurs, any one of the cassettes 160 can be removed from operative engagement with the associated jaw member 120 and another cassette can be readily replaced in substitution therefor. To retain the replaced and other cassettes 160 in operative engagement with the jaw members 120, it is merely necessary to shift the locking lever 182 to cause the associated locking bar 188 to move the detent lugs 192 into overlying relationship with the extremities of the dovetails 172 and, thus, lock the cassettes 160 in relationship with the jaw members 120.

THE FUNCTION, ARRANGEMENT AND OPERATION OF THE WELDING ELECTRODE FINGERS AND THE WELDING MECHANISM ASSOCIATED THEREWITH

As previously indicated, the welding electrode fingers 152 of the welding electrode means 150 are carried by the jaw members 120 into the welding position shown in FIGS. 6-12 of the drawings and into the cavity 46 defined between the opposed face sheets 42 and 44 so that they will be disposed in the positions shown in FIGS. 8-12 to accomplish this welding function.

The spacing, arrangement and relationship of the welding electrode fingers 152 in respect to each other and in respect to the core strips 48 and panel 40 being welded together by the action of the welding electrode fingers 152 can be best understood by considering the enlarged vertical sectional view of FIG. 8 and the plan views of FIGS. 9-12 which also disclose the maintenance of the welding electrode fingers in the associated cassettes 160 and the pattern which enables the welding tips 156 of the electrode fingers 152 to properly engage the respective securement portions 50 and overlapping nodal portions of said securement portions to accomplish precisely determined weld patterns in relationship thereto.

In the horizontal plane, the electrode fingers 152, FIGS. 9-12, are arranged so that the welding tips 156 define an essentially triangular pattern conforming to the configuration of the core strips 48 which have the securement portions 50 constituted by flanges 52, formed in an essentially truncated, triangular pattern during the formation process disclosed in the co-pending applications referred to hereinabove. Of course, alteration in the configuration of the core strips can be easily accommodated by reorientation of the pattern defined by the outer extremities of the welding fingers 152 which bear the welding tips 156.

When the welding means 150 is transported into the upper, operative welding position of FIGS. 6-12, they have been initially expanded by the action of the air bags 122 to securely maintain the respective core strip 48 in operative engagement with the welding means 150 so that it can be carried into registry with the preceding core strip 48 which has already been welded in operative relationship with the face sheets 42 and 44 on the panel 40.

Figure 9:
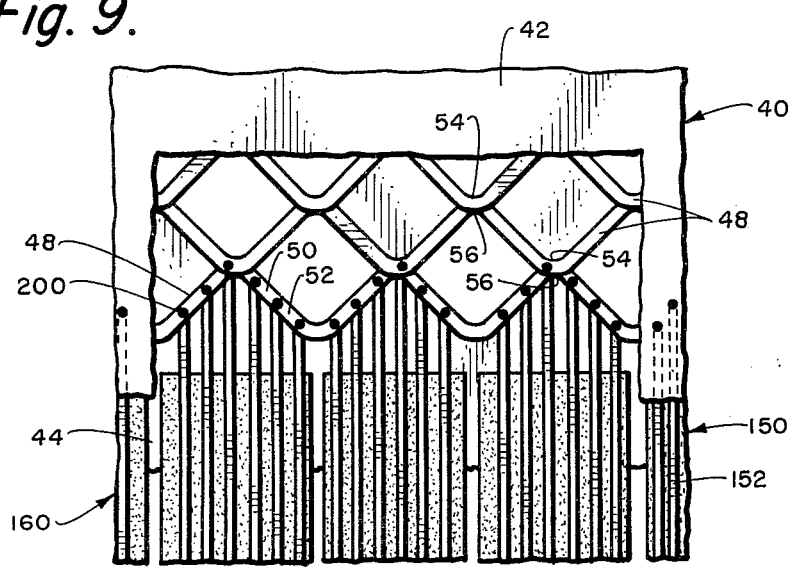
FIG. 9 is an enlarged fragmentary view taken from the broken line 9—9 of FIG. 8 and illustrating the initial series of weldments created by the welding electrode fingers.
Figure 10:
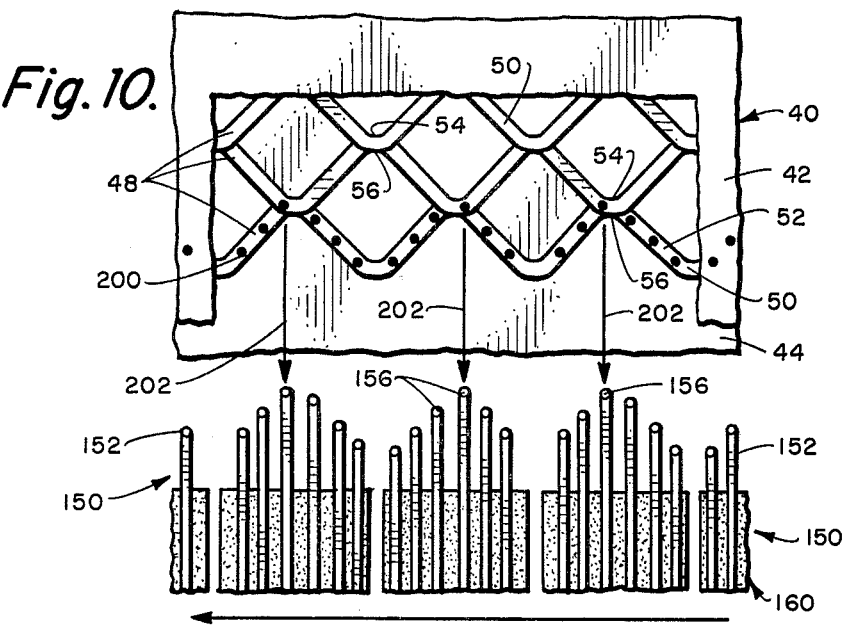
FIG. 10 is a view corresponding to FIG. 9 and illustrating the relationship of the welding electrode fingers with respective welds of the first series of welds.

The movement of the welding electrode fingers 152 into the welding position causes the internesting of the male nodes of the translated core strip 48 into the female nodes of the previously welded core strip to accomplish the internesting of the flanges or securement portions of the respective core strips as best shown in FIGS. 9–12 of the drawings. Simultaneously, the welding electrode fingers 152 are located in the first welding step position as shown in FIGS. 9–10 of the drawings. The significance of the term "first welding step position" will become apparent hereinbelow in further discussion of the internal welding operation accomplished by the welding electrode fingers 152.

The first internal welding pattern accomplished by the electrode fingers 152 is shown at 200 in FIGS. 9–10 of the drawings with the individual weldments disposed in a symmetrical pattern and at least one weldment being so located as to initially secure the overlapping flanges 52 of the core strips 48 in operative engagement with each other and the face sheets 42 and 44. The relationship of the welding tips 156 with the particular overlapping nodal welds is directionally exemplified by the arrows 202 in FIG. 10 of the drawings.

As previously indicated in discussing the construction of the panel 40 in the co-pending application relating to the panel construction, one of the significant factors relating to internal weldment of the securement portions or flanges of the core strip 48 is the relatively small welding nuggets that are created by the generation of the weldments internally of the panel rather than externally thereof as has been accomplished in the prior art mentioned hereinabove.

Another important aspect is the fact that the size of the nuggets can be controlled from the relatively infinitesimal to relatively massive in the light of what the weldments are to accomplish.

For instance, if a relatively light foil is used in the core strips 48 and only moderate penetration of the face sheets 42 and 44 of the panel is desired, relatively small welding nuggets can be generated.

Figure 11:
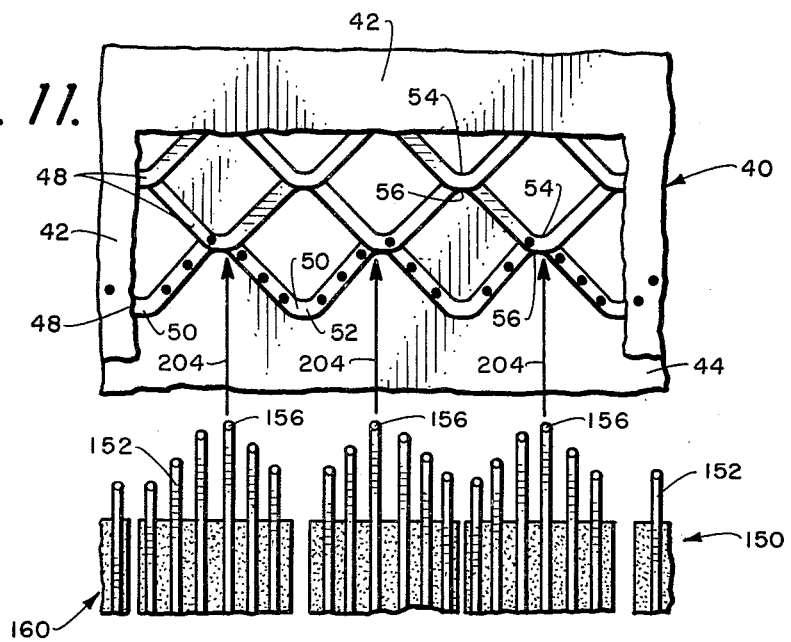
FIG. 11 is a view similar to FIG. 10 illustrating the lateral shifting of the welding electrode fingers prior to the movement of the fingers into engagement with the securement portions of the core strips to accomplish the creation of the second series of weldments interspersed with the previously created first series of weldments.
Figure 12:
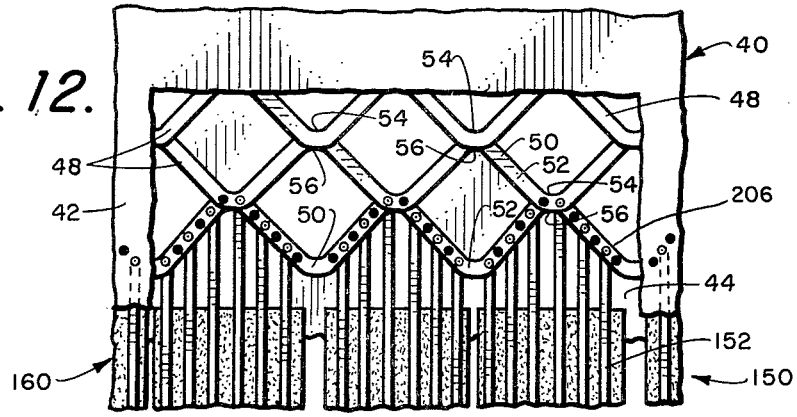
FIG. 12 is a view similar to FIG. 11 illustrating the engagement of the laterally shifted electrode fingers with the securement portions of the core strips and the creation of the second series of welds interspersed with the first series of welds.

The second welding position of the electrode fingers 152 is shown in FIGS. 11 and 12 of the drawings. The relationship of the welding electrodes 152 and the welding tips thereof is spatially established by the arrows 204, which indicate that the weldments of the second series of weldments will be located to the right of the first series of weldments to create the welding pattern shown at 206 of FIG. 12 wherein a continuous series of relatively small weldments is depicted. Of course, by suitable tip adjustments, more than two series of weldments can be made to reduce the space between the weldments.

The mechanism for establishing the lateral shift of the flange welding means 150 will be described in greater detail hereinbelow to clarify the manner in which the welding means 150 are shifted by the first, primary carriage 20 between the first and second welding positions.

The relative positions of the welding electrode fingers 152 and, more particularly, the welding tips 156 thereof in respect to the flanges or securement portions 52 and 54, respectively, of the core strips 48 is shown in FIG. 8 of the drawings. The manner in which the welding tips 156 engage the designated and chosen welding areas is depicted as well as the manner in which the foremost welding tip 156F engages the overlapped portions of the flanges 52 at the nodal areas.

With tips arranged generally as in FIGS. 10–12, it will be obvious that there will have to be as many welds in the securement portion overlap zones as there are series of welds or carriage shifts.

Previously discussed has been the manner in which the air bags 122 disposed between pivotally mounted jaw members 120 serve, under low pressure, to spread the jaw members 122 and, thus, the welding electrode means 150 constituted in part by the welding electrode fingers 152 so that the welding tips 156 thereof will engage the core strip 48 deposited thereupon and retain it in operative relationship with the welding electrode fingers 152 to accomplish the insertion of the core strip 48 into the space between the face sheets 42 and 44 of the panel 40 and into cooperative relationship with the previously inserted core strip.

After the insertion of the core strip 48 has been accomplished in the above described manner, the air bag 122 is subjected to a second, higher pressure by the actuation of the two step valve, not shown, which causes the air bag to impose a greater pressure on the welding electrodes 152 by expanding the jaw members 120 away from each other and, thus, causing the welding tips 156 to bias the securement or flange portions 50 and 52 of the core strip 48 into more intimate contact with the inner surface of the adjacent face sheet 42 or 44 and with the internested portion of the previously inserted core strip 48 at the nodal areas.

By the second step expansion of the air bags 122, the welding tips 156 are urged into more intimate engagement with the relevant areas of the securement portions 50 of the core strip 48 and also urge the securement portions 50, as constituted by the flanges 52, into more intimate contact with the inner surfaces of the face sheets 42 and 44 of the panel 40.

When the secondary expansion of the air bags 122 occurs, there is a corresponding resilient deflection of the electrode fingers 152 which forces the welding electrode tips 156 and 156F against the relevant areas of the flange or securement portions of the core strip 48, thus preloading the elongated welding fingers 152 and, more particularly, the forward extremities thereof which protrude from the welding cassette 160, as best shown in FIG. 19 of the drawings.

Consequently, during the welding phase of the operation, the low mass of the welding tips 156 and 156F causes them to follow the weld during the "melt" condition so that the welding tips 156 and 156F do not lose contact with the welding area during the welding melt step.

It will also be noted that the deflection of the lead or foremost welding tips 156F is somewhat greater than the deflection of the other tips 156 due to the double thickness of the internested flanges at the nodal areas of the core strips 48. This greater deflection illustrates the inherent resilience of the welding electrode fingers 152 and the inherently spring-like characteristics thereof.

Figure 14:
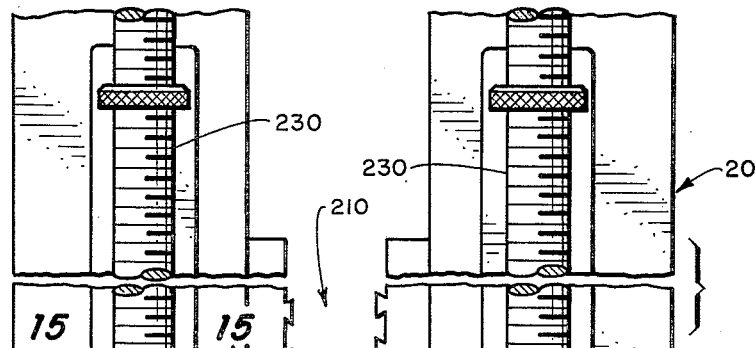
FIG. 14 is a fragmentary bottom plan view taken from the broken line 14—14 of FIG. 13 and illustrating the portion of the welding control circuit whereby the electrode fingers are intermittently and serially energized by the imposition of welding potential thereupon.

The welding current application means for the impressing of the welding current on the individual welding electrode fingers is accomplished by multiple contactor means 210 interposed in the welding circuit between the solid state welding controls, not shown, and the electrode finger extremities projecting from the rear portions of the electrode cassettes 160, as best shown in FIGS. 14, 16 and 19 of the drawings.

Figure 1:
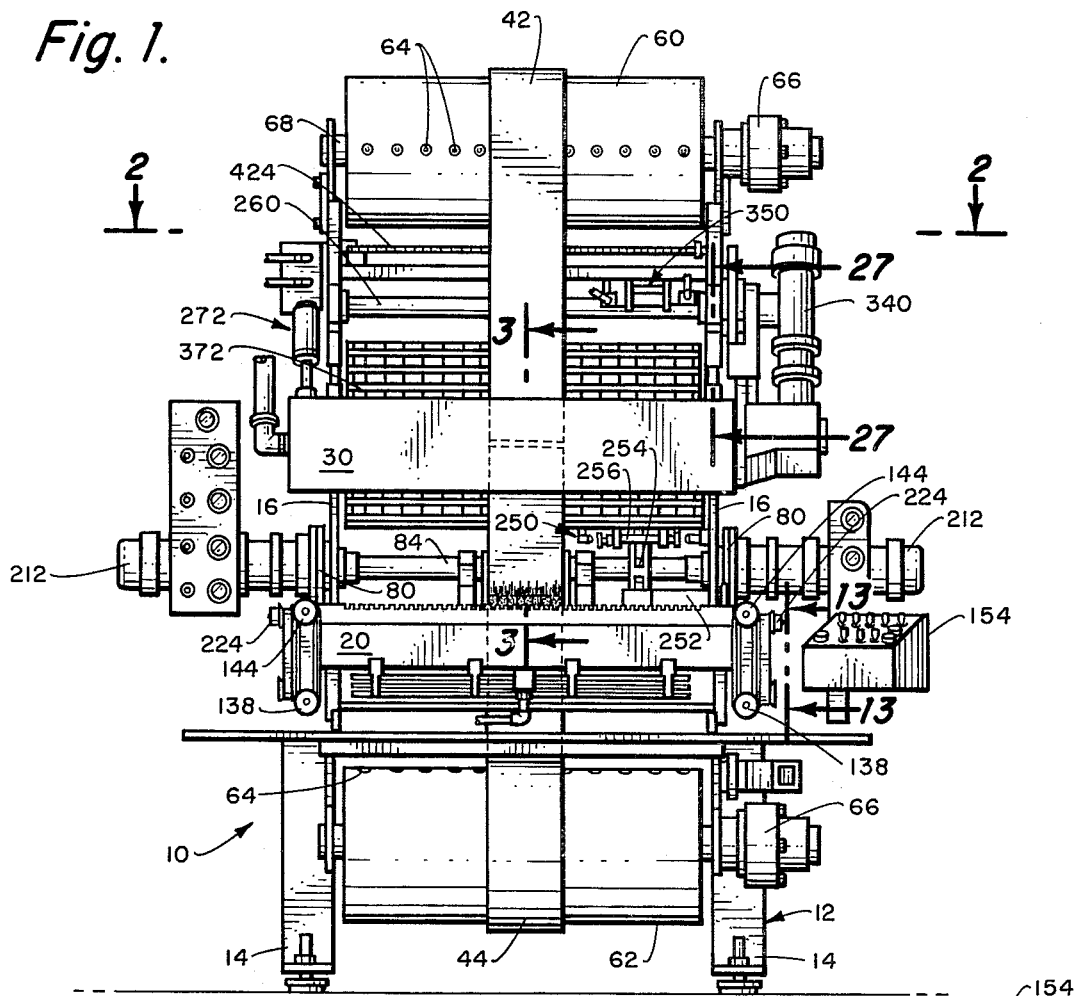
FIG. 1 is a front elevational view of the apparatus of the invention.

Mounted on opposite sides of the apparatus 10, as best shown in FIGS. 1 and 2 of the drawings, are clutch equipped drive motors 212 which run continually during the operation of the apparatus 10 and which are adapted to transmit rotary motion from their shafts to drive trains 214 at the opposite extremities of the primary carriage 20.

Each drive train, as best shown in FIG. 13, consists of a main drive belt 216 entrained on a dual sheave 218 which in turn drives a belt 220 having its intermediate bight entrained upon an idler sheave 224, another drive sheave 226 being driven by the belt 220.

Operatively secured to and driven by the drive sheaves 218 and 226 are identical lead screws 230 which extend from one side to the other of each primary welding carriage 20 and which have lead nuts 232 mounted thereupon which support gimbled carriages 234 for contact arms 236 having contact bosses 238 thereupon separately and seriatimly engageable with the rear extremities of the electrode fingers 152 to cause the welding current to be impressed thereupon. The contact bosses consist of a series of co-linear boss segments.

Consequently, the individual welding electrode fingers 152, when subjected to the intermittent welding pulse, form the first and second welding patterns as illustrated in FIGS. 9-12.

It is, of course, possible to increase the welding current as desired and to accomplish the complete penetration of the face sheets 42 and 44 of the panel 40 in order to permit the simultaneous weldment of the core to the face sheets and externally positioned objects on the external surfaces of the face sheets.

Of course, the internesting of the flanges 52 of the core strips 48 disposes said flanges in overlapping relationship and, thus, the welding potential sufficient to secure the unnested portions of the flanges 52 is sometimes not sufficient to accomplish the effective securement of the internested flanges at the nodal points to one another and to the face sheets 42 and 44. Therefore, we have developed a method of impressing increased welding potential on the internested flanges by the device of providing triggering mechanisms constituting bosses or pins, not shown, mounted in adjacency to the path of the contactor carriages 234 so that, as the carriages are traversed by the action of the associated lead screws 230, a greater current pulse will be impressed on the foremost welding tips 156F which are engaged with the overlapping, internested flanges of the core strips 48. Therefore, a weld nugget having greater penetration is achieved on the foremost welding tips 156F without altering the current impressed upon the other welding tips.

By the triggering device of our invention, it is possible to create selective welding patterns whereby any one of the welding tips may have greater welding potential impressed thereupon. It is also possible, by this means, to achieve panels consisting of several core and face sheet layers wherein the core can be fastened to the external surface of one of the face sheets by providing a single, upper face sheet and inserting the welding electrode fingers into cooperative relationship with the core structure to fasten the lower flanges thereof in operative relationship with the external surface of one of the face sheets.

Figure 15:
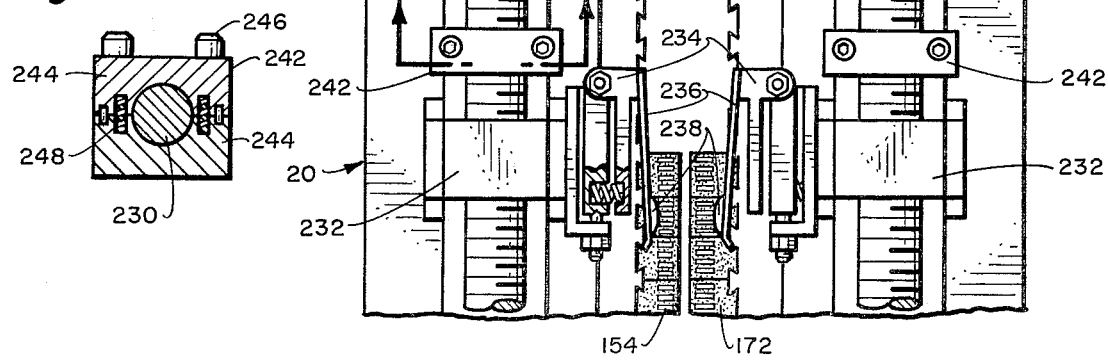
FIG. 15 is a transverse sectional view taken on the broken line 15—15 of FIG. 14 and illustrating a portion of the welding control mechanism.

Mounted in operative relationship with the lead screw are lead screw blocks 242 which, as best shown in FIG. 15 of the drawings, consist of two threaded halves 244 maintained in operative relationship by means of bolts 246. The lead screw blocks can be rendered inoperative by the expedient of releasing the bolts and permitting springs 248 to expand the block halves out of engagement with the thread of the lead screws 230.

A portion of the electrical distribution system which provides welding current for the contactor carriages 234 is illustrated in FIG. 16 of the drawings as including a plurality of bus bars 252 which are electrically connected to the welding controls by conductor 254.

Although it might be feasible to provide a single contactor carriage and the associated contacts and gimble mountings for each of the lead screws, the time encompassed in traversing the entire lengths of lead screws in fabricating a relatively wide panel would undesirably affect the productivity of the apparatus 10. Therefore, the cassettes 160 have been arranged in banks of a selected number, for instance, sixteen cassettes 160 and a separate contactor carriage 234 caused to operate in the particular sector encompassed by the width of the chosen number of cassettes 160. Similar arrangements extend across the width of the apparatus 10 and, thus, the various areas of the panel are simultaneously welded by a plurality of fingers and the individual contactor 210 associated therewith, materially reducing the time expended for the welding step and, of course, materially reducing the traversing distance of the individual contactor assemblies 210.

THE CONCLUSION OF THE SECUREMENT PORTION, FLANGE WELDING CYCLE

When the contactor carriages 234 have fully traversed their relevant sectors and completed the interspersed second welding pattern, they reach their limits of movement and trigger a sensor, not shown, to terminate the operation of the lead screws 230 and the carriages 234 themselves.

The actuation of the sensor causes the deflation of the air bags 122 which maintain the jaw members 120 in the expanded position in which the welding tips 156 of the electrode fingers 152 are urged against the corresponding portions of the securement flanges 52 of the core strips 48.

The deflation of the air bags 122 permits the torsion springs, not shown, associated with the jaw members 120 to urge the jaw members toward each other thus releasing the welding tips 156 from the contiguous welded areas. Simultaneously, the actuating assembly 90, FIG. 30, is energized to cause the hydraulic cylinders 92 to rotate the first welding carriage 20 in a counterclockwise direction, withdrawing the welding jaws 112 and jaw members 120 mounted thereupon from the uppermost welding position and moving the entire assemblage into the withdrawn loading position shown in FIG. 3 of the drawings.

THE LATERAL INDEXING MEANS FOR THE FIRST, INTERNAL WELDING CARRIAGE

As previously mentioned, the shaft 84 which carries the first welding carriage 120 is laterally movable to permit the creation of the first and second welding patterns shown in FIGS. 8-12 of the drawings by permitting the first welding pattern to be created and by then shifting the welding electrode fingers 152 a relatively short distance to cause them to impinge on unwelded areas between the previously created welds of the first welding pattern and to cause the creation of the second welding pattern which results in a uniform sequence of weldments on the flanges 52 of the core strips 48.

The lateral indexing means is shown at 250 in schematic fashion in FIG. 1 of the drawings and includes a hydraulic cylinder 252 which is connected to the shaft 84 by a linkage 254 so that the hydraulic cylinder can move the shaft 84 the desired distance laterally to accomplish the creation of the second welding pattern.

The distance that the hydraulic cylinder 252 is permitted to move the shaft 84 is determined by adjustable stop means 256 indicated schematically in FIG. 1 of the drawings. The stop means includes adjustments which permit the distance traversed by the shaft 84 under the driving force communicated thereto by the hydraulic cylinder 252 to be adjusted to the desired width of the first and second welding patterns being created by the action of the welding electrode fingers 152.

Therefore, when the completion of the welding pattern has been achieved by making the first and second series of welds and the first, flange welding carriage 20 is withdrawn from the upper welding position shown in FIG. 6 of the drawings, the shaft 84 and, of course, the first welding carriage 20 are shifted one-half cell width to provide proper position for the next core element to be inserted. Thus, there are, for a two-position weld pattern, four positions of the shaft 84, i.e.:
1. one-half cell width shift left, pattern shift left;
2. one-half cell width shift left, pattern shift right;
3. one-half cell width shift right, pattern shift right;
4. one-half cell width shift right, pattern shift left.

THE CONSTRUCTION AND OPERATION OF THE SECOND, NODE WELDING CARRIAGE 30

Figure 5:
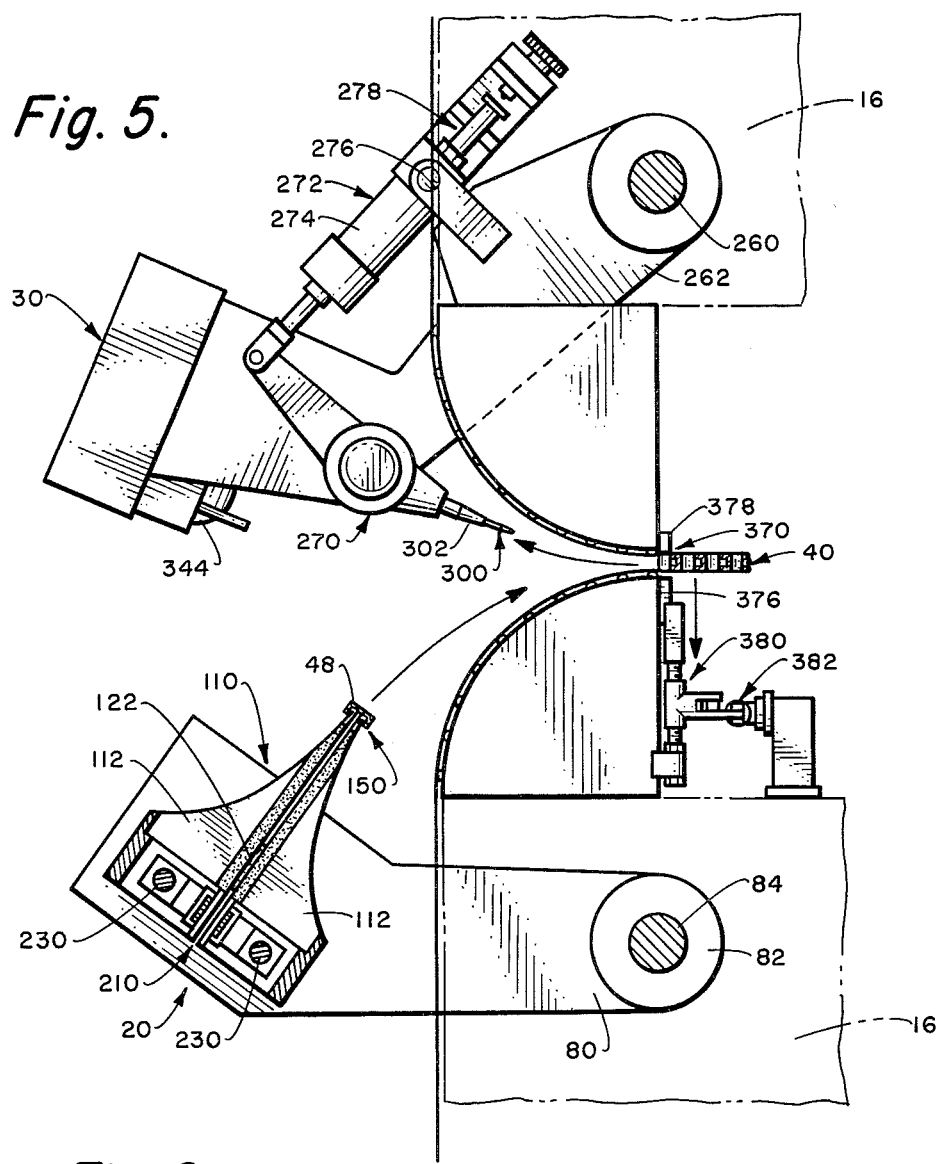
FIG. 5 is a view similar to FIG. 3 showing the retraction of the second carriage and the initiation of movement of the first carriage.

As previously indicated, the downward movement of the first, flange welding carriage 20 is accompanied by the downward rotation of the second welding carriage 30, as best shown in FIG. 5 of the drawings, so that, when the first welding carriage reaches the ultimate limits of movement shown in FIG. 3 of the drawings, the second welding carriage will be located in its lowermost position wherein the welding cycle resulting in the welding of the nodal areas 54 and 56 of adjacent core strips 48 can be accomplished in a manner to be described in greater detail below.

The second welding carriage is mounted for rotation on a shaft 260 by means of mounting arms 262, one of which is shown in FIGS. 3 and 5-6 of the drawings. To accomplish the movement of the second welding carriage 30 concommitantly with the first welding carriage 20, a linkage, not shown, connects the shafts 84 and 260 so that simultaneous rotation of the shafts occurs to cause simultaneous movement of the carriages 20 and 30.

THE NODE WELDING HEAD

Mounted for rotation on the carriage 30 is an elongated node welding head 270 which, as best shown in FIGS. 3, 5 and 6 of the drawings, is rotatable by a hydraulic cylinder 272 whose housing 274 is pivotally mounted at 276 on one of the secondary carriage 30 mounting arms 262. Therefore, the elongated welding head extends across the apparatus 10 so that it can, in a manner to be described in greater detail below, accomplish the weldment of the nodal areas 54 and 56 of adjacent core strips 48 to one another.

Associated with the hydraulic cylinder 272, which is adapted to cause relative rotation of the elongated welding head 270 with reference to the carriage 30, is motion limiting means 278 which serves to limit the extent to which the elongated welding head 270 can be rotated with respect to the secondary welding carriage 230.

The construction and assembly of various components of the welding head 270 are most clearly shown in FIGS. 21-24 of the drawings as including an elongated welding head housing 280, said housing having a plurality of bores 282, FIGS. 23-24, formed therein for the reception of individual welding tip assemblies 284. Each of the welding tip assemblies 284, as best shown in FIGS. 20, 23 and 24 of the drawings, includes an elongated cylindrical shaft 286 having a piston 288 intermediate its extremities. The piston 288 incorporates circumferential sealing rings 292 separated by corresponding circumferential grooves 293. A generally square forward extremity 294 of the shaft 286 incorporates a threaded bore 296 for the reception of the correspondingly threaded rear extremity 298 of the node welding tip 300.

Inserted in the forward extremity of the elongated bore 282 in the body 280 is a welding tip guide 302, FIGS. 23-24, which serves to guide the square forward extremity 294 of the shaft 286 by providing a correspondingly shaped guideway 304 in the forward extremity thereof. The rearward extremity 306 of the shaft 286 is guided in a bushing 308 mounted in the rearward portion of the bore 282 and incorporates a threaded bore 312 for the reception of a screw fastener 314 for a purpose which will be described in greater detail below.

An elongated air pressure manifold 316 extends the length of the housing 280 and communicates through a port 318 with the elongated bore 282 to maintain a continuous pressure on the rearward side of the piston 288 to force the piston 288 in a right hand direction, as best shown in FIG. 23 of the drawings, to urge the node welding tip 300 outwardly into engagement with the corresponding portion of the nodal area 56 of the core strip 48 being welded at the nodal area, as best shown in FIGS. 4 and 23 of the drawings.

Therefore, the welding tip 300 will normally impinge upon the adjacent surface of the relevant nodal area of the core strip 48 because of the continuous pressure exerted upon the piston 288 to urge the welding tip 300 into the welding position. However, since the welding tip 300 and all of the associated welding tips must be moved through a vertical welding pattern from the top to the bottom or the bottom to the top of each nodal area being welded, it is necessary to withdraw the welding tip 300 from operative, welding engagement with the nodal area of the core strip 48 being welded. This withdrawal action is accomplished by withdrawal means generally indicated at 320 in FIGS. 23 and 24 of the drawings.

The withdrawal means consists of an elongated rotatable cam 322 mounted for rotation on a shaft 324 and having a flat 326 thereupon. The cam 322 is engageable with a withdrawal lever 328 pivoted at 332 upon the housing 280 and incorporating a bore 334 at its lower extremity which encompasses the reduced cylindrical portion 306 of the shaft 286 and is retained in operative engagement therewith by the previously adverted to fastener 314. When the shaft 324 is rotated, the cam 322 is correspondingly rotated to sequentially engage the cylindrical and flat portions of the cam 322 with the corresponding contiguous area of the withdrawal lever 328. When the cylindrical portion of the cam 322 is in engagement with the withdrawal lever 328, it causes the withdrawal of the welding tip 300 from engagement with the corresponding portion of the nodal area of the core strip 48 being welded.

Conversely, when the flat 326 of the cam 322 is contiguous to the inner surface of the lever 328, the lever 328, as best shown in FIG. 23 of the drawings, permits the outward movement of the shaft 286 and the associated welding tip 300 to cause the extremity of the welding tip 300 to impinge upon the relevant portion of the nodal area being welded, as best shown in FIGS. 4 and 23 of the drawings.

Mounted in operative relationship with the secondary carriage 30, as best shown in FIGS. 1-2 of the drawings, is a drive motor 340 which is operatively connected to a drive shaft 342, FIG. 21 of the drawings, to drive the cam shaft 324 on which the cams 322 are mounted.

Shown in greater detail in FIG. 21 of the drawings is the motion limiting means 278 which controls the rotation of the housing 280 of the node welding head 270 to control the movement of the welding tips 300 as they are traversed through the node welding pattern. Mounted upon an extremity of the piston rod 328 of the hydraulic cylinder 272 is an adjustable disc 332 which moves between adjustable limit switches 334 and 336, which determine the maximum limit of movement of the welding head 270 by the pivotal connection of said head to the piston rod at 338. Therefore, the upper and lower limits of movement of the welding tips 300, as best shown in FIG. 4 of the drawings, by the action of the hydraulic cylinder 272 can be determined and can be adjusted to accommodate panels of different thicknesses having core strips of different dimensions.

The welding tips 300 are supplied with welding current from a welding control circuit and are powered by transformers 344 supported upon the secondary welding head 30 as shown in FIG. 3 of the drawings.

Therefore, as the welding tips 300 are moved upwardly from the lowermost position shown in FIG. 4 of the drawings or downwardly from an uppermost position to a lowermost position, the withdrawal means 320 is operated in conjunction with the welding controls whereby, when the welding tips 300 are withdrawn from operative relationship with the nodal areas 56 and 54 of adjacent core strips 48, the welding circuits are not fired. However, as soon as the welding tips 300 are moved into engagement with the portions of the nodal areas 56 and 54 to be welded, the welding circuits are fired to energize the welding tips 300.

THE LATERAL SHIFT MEANS FOR THE SECONDARY CARRIAGE 30

As will be apparent to those skilled in the art, each core strip 48 which is inserted into conjunction with a previously inserted core strip 48 will involve a lateral shift of the nodal areas as clearly illustrated in FIGS. 9-11 of the drawings. In other words, in one location the welding tips 300 are located in the trough of a corrugation as illustrated by the arrows 204 in FIG. 11 and in the subsequent location the welding tips 300 must contact a trough which is located in engagement with the previously welded strip and shifted to the left or right as the case may be.

To accomplish the lateral shift of the node welding head 270, lateral shifting means 350 is provided as shown schematically in FIG. 1 of the drawings. The lateral shifting means includes a hydraulic cylinder and limit switches, not shown, which determine the extent of the lateral shift of the shaft 260 and, thus, the lateral shift of the individual welding tips 300.

When the first welding head is indexed one-half cell to the left, the second welding head is indexed one-half cell to the right, and vice versa.

After the completion of the node welding operation on a core strip, automatic switching means energizes the actuation assembly 90 to withdraw the secondary node welding head 30 from operative engagement with the panel 40 and to move the secondary welding head 30 to the uppermost position as shown in FIG. 6 of the drawings. As previously indicated, when movement of either carriage occurs, simultaneous movement of the other carriage takes place and the upward movement of the secondary welding carriage 30 is accompanied by simultaneous upward movement of the primary welding carriage 30 into the operative position.

During the movement of the carriages, the face sheets 42 and 44 can be incrementally fed downwardly and upwardly respectively together with simultaneous movement of the yoke 70 and the wedge blocks 354 which constitute a part of the yoke, as best shown in FIGS. 2 and 28-29 of the drawings. As previously mentioned, the yoke 70 may be connected to a hydraulic motor which will assist in drawing the panel between the guide bars 74 but it is also conceivable that the sole motive power for the yoke will be the mere incremental feeding of the panel 40 from the delivery end of the apparatus 10.

The wedge blocks 354, as best shown in FIGS. 28 and 29 of the drawings, include housings 356 incorporating spring biased wedge members 358 which permit the yoke to move rearwardly of the apparatus 10 towards the outer extremities of the guide bars 74, but which prevent the yoke from moving toward the apparatus until they are released by depressing an associated pin 362. Consequently, the panel 40 and the face sheets 42 and 44 are kept in that state of optimum tension and flatness which is necessary to maintain the co-planarity of the face sheets 42 and 44 with each other during the critical location of the face sheets in the throat 370 of the apparatus 10 as best shown in FIGS. 3, 5 and 6 of the drawings.

As the face sheets 42 and 44 are drawn into the throat, they traverse a series of arcuately arranged supporting bars 372, as best shown in FIGS. 1 and 4 of the drawings.

THE CONSTRUCTION AND OPERATION OF THE THROAT OF THE APPARATUS

The throat 370 is defined, as best shown in FIGS. 3-6 of the drawings, by a pair of conductive throat jaws consisting of a lower jaw 376 and an upper jaw 378. The jaws 376 and 378 are, as best shown in FIGS. 3, 5, 6 and 25-27 of the drawings, constituted by elongated rectangular bars which are movable, by structures and in manners to be described in greater detail below, toward or away from each other. The basic function of the jaws is to maintain the maximum co-planarity of the face sheets 42 and 44 of the panel 40 being fabricated with each other and to maintain the maximum welding engagement of the face sheets with the core strip 48 which is being welded to the internal surfaces of the face sheets 42 and 44 and, also, to maintain the nodal areas of the core strip 48 being welded in operative relationship with each other in maximum welding contiguity.

As a preliminary matter, it should be pointed out that the basic difference between the functioning of the lower jaw 376 and the upper jaw 378 lies in the fact that the lower jaw 376 is adapted to be moved out of contact with the lower face sheet 42 each time the panel 40 being fabricated is advanced through the apparatus while the upper jaw 378 is movable only in an adjustment sense, that is, as will be described in greater detail below, the upper jaw 378 is adjusted to accommodate different thicknesses of panel while the lower jaw 376 serves as the clamping means for the components of the panel 40 being fabricated and locks them against movement by urging the panel assembly upwardly towards the upper jaw 378.

Figure 25:
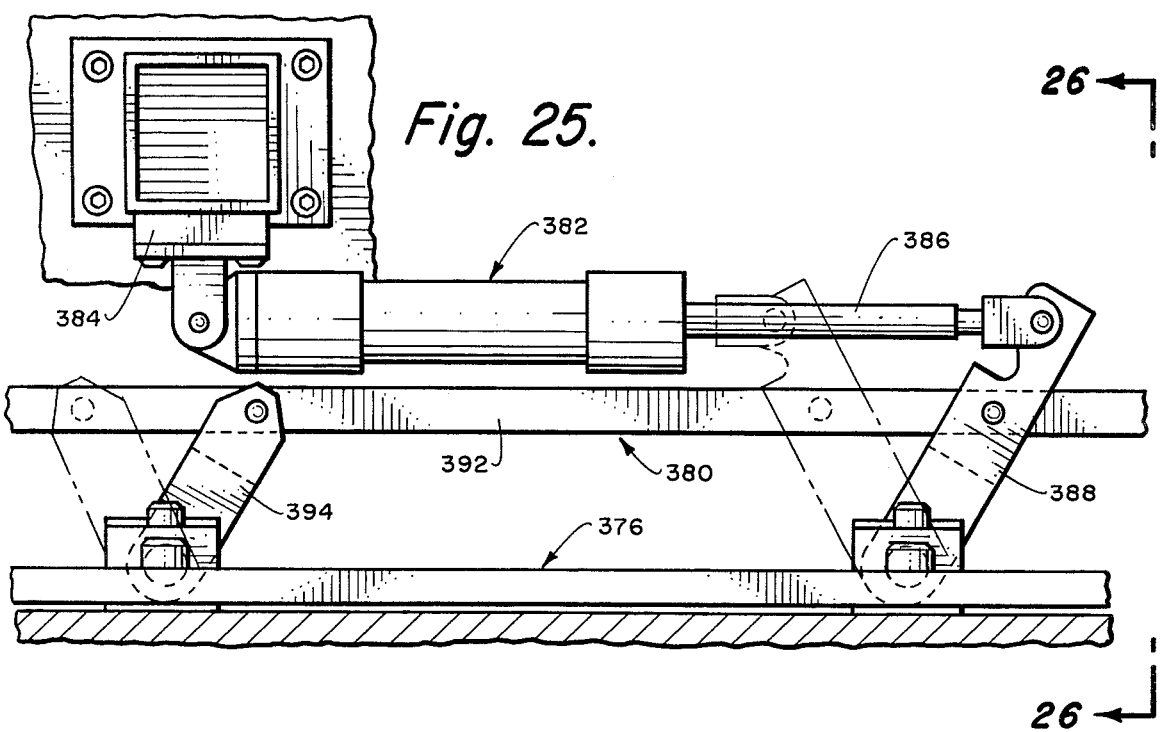
FIG. 25 is a partly sectional top plan view illustrating the mechanism for retracting and advancing the throat jaw taken from line 25 of FIG. 2.
Figure 26:
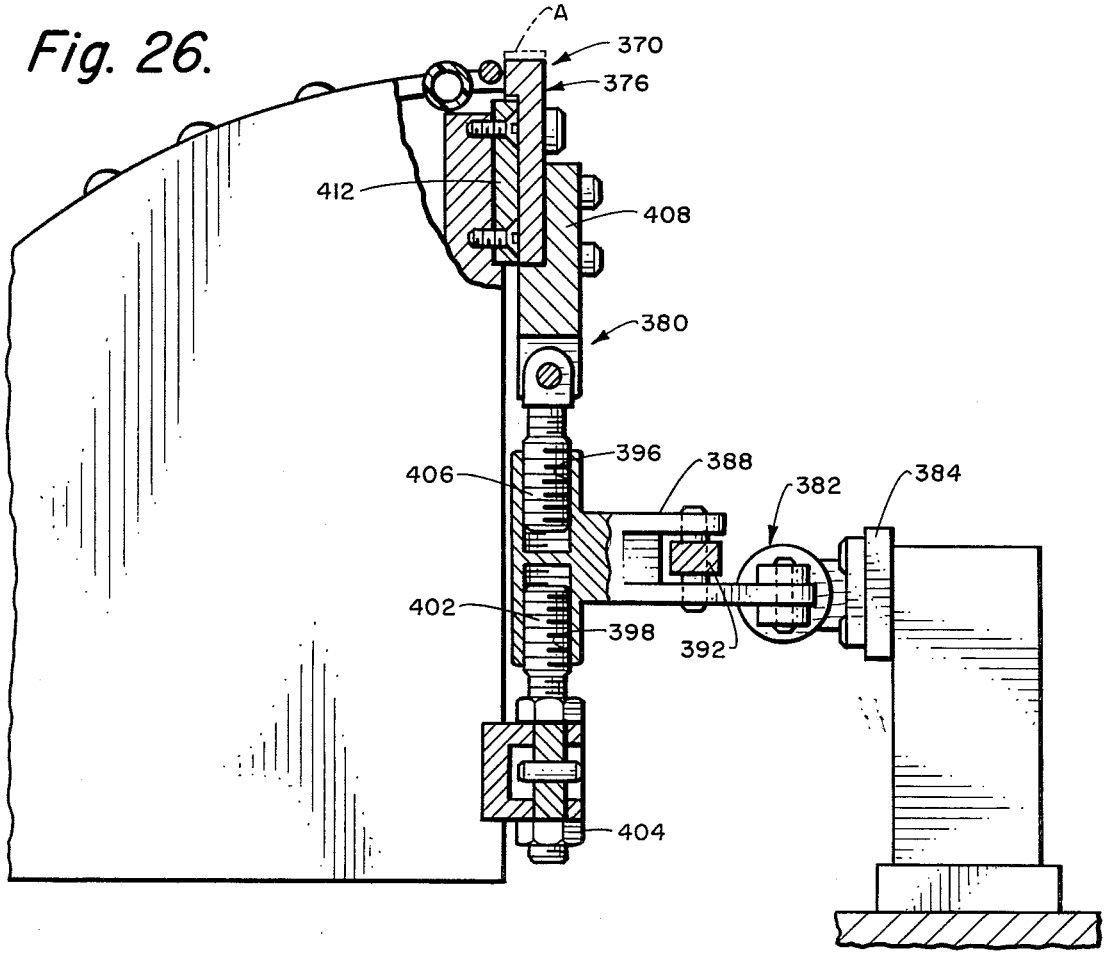
FIG. 26 is a view taken from the broken line 26—26 of FIG. 25 of the throat jaw mechanism.

The operating assembly 380 of the lower jaw 376 is best shown in FIGS. 25 and 26 of the drawings as including a hydraulic cylinder 382 which is pivotally mounted on a mounting block 384 at one end. A piston rod 386 is connected to a lever 388 which is also connected to an actuating bar 392. The actuating bar 392 is adapted to move actuating levers 394 along the length of the throat jaw 376.

The inner extremities of the levers 388 and 394 are constituted by threaded upper and lower bosses 396 and 398. Engaged in the lower bosses 398 are adjustment screws 402 which can bodily raise and lower the levers 388 and 394 by rotation of the screws 402 in the threaded bosses 398. Lock nut means 404 prevents inadvertent rotation of the adjustment means. Raising and lowering screws 406 are threadably engaged in the bosses 396 and pivotally connected to an elongated carriage 408 which is, in turn, connected to the lower throat jaw 376 which moves on a guide bed 412.

Therefore, when the components of the panel 40 constituted by the face sheets 42 and 44 and the core strips 48 are being fed into the throat 370 of the apparatus, the lower jaw 376 is retracted to the lowermost position shown in FIG. 26 of the drawing. However, when the components are in place and properly oriented with respect to each other and are ready to be welded, the lower jaw member 376 is moved upwardly to the uppermost position as shown at A in FIG. 26 of the drawings to clamp the various components of the panel 40 in operative engagement with one another and to prevent shifting thereof during the welding process.

As previously mentioned, the upper jaw 378 is mounted for movement with respect to a lower jaw 376 whereby the maximum or minimum dimension of the throat 370 can be adjusted and, also, the relative position of the node welding carriage 30 can also be simultaneously adjusted so that the welding tips 300 thereof can be properly located in respect to the increased or reduced dimensions of the core strips incorporated in the increased or reduced size panel.

Figure 27:
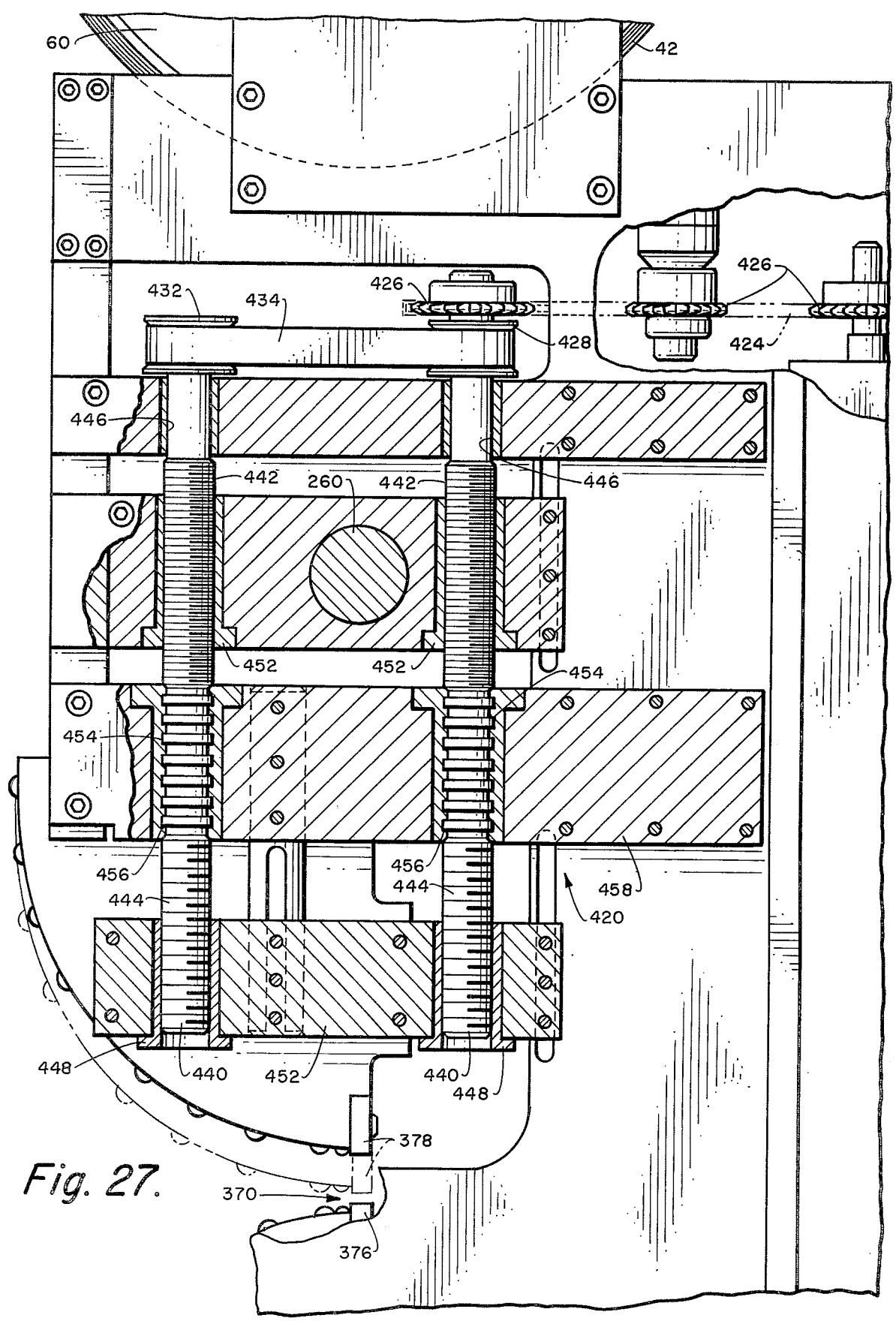
FIG. 27 is an enlarged fragmentary sectional view taken on the broken line 27—27 of FIG. 1 and illustrating the adjustment means for the second carriage and the upper throat jaw.

The adjustment means 420 for the upper jaw 378 is shown in FIG. 27 of the drawings and it should be understood that adjustment means 420 are located on opposite sides of the apparatus to insure simultaneous and equal adjustment of the upper jaw 378 and the node welding carriage 30.

The adjustment means 420 includes a hand crank 422, FIG. 2 of the drawings, which drives a chain 424 which is entrained upon sprockets 426 which constitute the drive train of the adjustment means as also shown in FIG. 27 of the drawings.

One of the sprockets 426 has a sheave 428 associated therewith adapted to drive a corresponding sheave 432 through a belt 434. Each of the sheaves 428 and 432 is secured to a compound lead screw 440 which includes a first threaded portion 442 consisting of a relatively fine thread and a second threaded portion 444 consisting of a relatively coarse thread in comparison with the thread 442. The upper and lower extremities of the lead screws 440 are mounted in bushings 446 and 448, respectively, and rotation of the lead screws is accomplished by the rotation of the crank 422, FIG. 1, which causes corresponding movement of the chain 424 and the sprockets 426, said movement in a rotary sense being communicated by the sheaves 428 and 432 to the lead screws 440.

Mounted on the fine thread portion 442 of each of the lead screws 440 by means of correspondingly threaded bushings 452 is a mounting block which supports the rotatable shaft 260 of the secondary, node welding carriage 30. Consequently, when the lead screws 440 are rotated, the block is moved up or down to adjust the relative position of the carriage 30 with respect to the throat 270.

The lower, coarsely threaded extremities 444 of the lead screws 440 are threadably engaged in the bushings 448 located in the traversing block 452 which is secured to the upper throat jaw 378 so that rotation of the lead screws 440 can cause corresponding raising or lowering of the upper throat jaw 378. It will be noted that the intermediate portions of the lead screws 440 are secured against axial movement by internested ribs 454 which are engaged with corresponding grooves 456 in bushings mounted in a fixed block 458.

The relationship between the fine threaded portion 442 and coarse threaded portion 444 of the lead screws 440 becomes apparent in that the welding tips 300, as carried upon the secondary carriage 30 through the shaft 260, must always be located in a predetermined spatial relationship with the throat 370. Therefore, when the upper throat jaw 378 is shifted downwardly a predetermined increment, for instance, 0.005 thousandths, the block supporting the shaft 260 of the carriage 30 will be moved downwardly 0.0025 so that the carriage will only be shifted half the distance of the upper throat jaw 378.

SEQUENTIAL OPERATION OF APPARATUS 10

A sequential operations chart is shown in FIG. 31 of the drawings and broadly outlines the sequence of steps involved in the operation of the apparatus 10. On the left-hand side of the chart, headed by the term "Outputs" which indicates the major function that is the output of the machine at that particular time, are the various major sequence steps which take place. However, as will be apparent from a consultation of the chart and the accompanying review thereof hereinbelow, numerous ancillary steps take place with the major steps adverted to in the left-hand column.

On the top of the chart, reference is made to both the components of the apparatus 10 and major functions of the apparatus.

Each of these operations is designated by a sequence number in the left-hand column on the chart and juxtaposed to the left-hand column are numeral designations afforded to the more important microswitches or sensors which determine the initiation and cessation of the sequence functions. Thus, the steps of the sequence are associated with the particular sensor which determines the initiation of the function. Similarly, at the right-hand side of the chart in the first numbered column, there is a sensor numerical designation which denotes the cessation of the particular sequence as determined by the particular sensor associated with the sequence.

The initial step of a total sequence of operation for the apparatus 10 involves the loading of the core strip or ribbon 48 upon the welding electrode means 150 as constituted by the welding electrode fingers 152.

A manually actuated switch is depressed to initiate sequence 1 which causes the primary carriage 20 to carry the core strip 48 upwardly into welding position between the face sheets 42 and 44. When the initial movement of the primary carriage 20 takes place, the carriage 20 is indexed to the right-hand side of the apparatus 10. The lower throat jaw is open to permit the core strip 48 to be inserted into the welding position and the secondary carriage 30 is located in the inoperative position.

In the second sequence of operations, the lower throat jaw is moved upwardly into engagement with the lower surface sheet 44 to clamp the various components of the panel 40 in operative relationship with one another to insure that they are properly located during the subsequent welding cycle.

In the third operational sequence, all of the previous steps remain the same but the high pressure air is impressed on the air bags 122 to urge the jaw members 120 outwardly and away from each other in order that the welding electrode fingers 152 and, more particularly, the welding electrode tips 156 thereof are biased firmly against the securement or flange portions 50 and 52 of the core strips 48 and are preloaded so that the welding tips 156 will follow the molten metal during the "melt" phase of the welding cycle.

The fourth sequence step involves the initiation of the welding cycle by causing the movement of the contactor means 210 to the left. When the first welding pattern, as best shown in FIGS. 9 and 10 of the drawings, is completed, the traverse of the contactor means 210 is terminated by the operation of the associated limit switch and the apparatus 10 is automatically prepared for the creation of the second welding pattern shown in FIGS. 11 and 12 of the drawings.

To accomplish the transition from the first welding pattern condition to the second welding pattern condition of the apparatus 10, sequence 5 of the sequence steps causes the high pressure air to be released from the air bags 122. This permits the jaw members 120 to be moved toward each other by the action of the torsion springs, not shown, and also releases the welding tips 152 of the welding electrode fingers 154 from the preload engagement with the flanges 52 of the core strips 48 so that the welding tips 152 can be physically shifted in preparation for their creation of the second welding pattern sequence.

The initial number 6 sequence entails the outward indexing of the primary carriage 20 by the hydraulic cylinder 98 as previously described, thus permitting lateral movement of the carriage 20 in a subsequent sequence step.

In subsequent sequence step 7, the primary carriage 20 and the welding means 150 mounted thereupon are indexed to the left as previously described to place the welding electrode fingers 150 in the initial position in which they are located to create the second welding pattern.

Sequence step 8 entails the inward movement of the primary welding carriage 20 and concomitant inward movement of the welding electrode fingers 152 into a position in which they are located over the areas of the flanges 50 of the core strips 48 to be welded in the second welding pattern.

After the location of the electrode fingers 152 by the indexing of the fingers to the left and their movement inwardly into the welding position, sequence step 9 introduces high pressure air into the air bags 122 forcing the electrode fingers 152 into the preload condition previously described.

The contactor means 210, by sequence step 10, are shifted to the right to create the second welding pattern. The high pressure air is then released from the bags 122 by sequence step 11 and the electrode fingers 152 are released from the preload condition so that sequence step 12 can cause downward movement of the primary carriage 20. As previously described, the downward movement of the primary carriage 20 is accompanied by simultaneous downward movement of the secondary carriage 30 to locate the node welding head 270 in welding position. The weldment of the nodes 54 and 56 of juxtaposed core strips 48 is accomplished by sequence step 13 and the lower throat jaw is released during sequence step 14 to permit the panel 40 to be advanced into the position in which it can receive a new core ribbon or strip 48 from the primary carriage 20 during a subsequent series of sequences.

In the subsequent operational series of sequences 15 through 29, there is a substantial repetition of the sequence steps 1 through 14 so there is no necessity for repeating the additional sequence steps set forth in the sequence chart. However, due to the double indexing or shifting of the primary carriage 20, all steps on the sequence chart must be completed before all functions return to 00. Of course, it will be obvious to those skilled in the art that, if desired, certain sequence steps can be eliminated, for instance, where only flange welding of the core strips 48 in operative relationship with the face sheets 42 and 44 is desired because of core configurations where nodal welding of the core strips does not occur.

It should be noted that the conductive throat jaws 376 and 378 constitute the grounds for the welding circuits.

The multiple contactor means, previously referred to on page 50, is not only a novel method of sequentially impressing welding current (or voltage) on the electrode fingers of the internal welding means, but may be equally well utilized to sequentially apply welding current or voltage to nodal column weldments or to any welded joint wherein a multiplicity of spaced weldments is desired. An object of our invention is the use of a translatable contact or means to complete the secondary circuit of a welding transformer and associated welding electrodes such that said welding electrodes are sequentially energized by said welding transformer, whether the number of said electrodes is small, for example, 2, or large, for example, 600.

Shown in FIG. 32 is a schematic electrical diagram of the node welding circuit. Both the electrode fingers and node welding tips are connected through intermediary circuits, to be discussed hereinbelow, to a common power source designated as such in FIG. 32. The power source is connected to a flange welding potential source which, in turn, is connected to pulse generating means which determines the duration and magnitude of the pulses of welding potential impressed upon the electrode finger by a movable contactor 232. Obviously, the flange welding potential source and pulsing means can be adjusted to control the duration of the pulse, the time interval between the pulses and the magnitude of the voltage of the pulses.

There is a node welding potential source connected to the power source which also has its output connected to pulsing means, said pulsing means, in turn, being connected to the node welding tips.

As in the case of the flange welding circuitry, the welding potential pulse is impressed on the node welding tips and can have its duration and magnitude adjusted to cope with the type and the gauge of materials being welded in the apparatus.

CONCLUSION

As mentioned throughout the preceding description of the construction and mode of operation of the apparatus 10, various elements and components thereof can be replaced by components which are different in construction but which function to achieve the same ultimate purpose. Therefore, it is not our intention to be limited to specific elements of the construction but, rather, to provide an apparatus 10 consisting of a number of components designed to accomplish and achieve the structure and mode of operation defined in the claims presented hereinbelow.

We claim:

1. In a welding apparatus for welding metallic face sheets to metallic core strips located in a cavity between said face sheets, said core strips having securement portions thereupon for weldment to contiguous and opposed inner surfaces of said face sheets, the combination of: welding head means movable into and out of said cavity; welding electrode means on said welding head means, said welding electrode means including spaced banks of individually energizable and movable electrodes engageable with said securement portions of a core strip to carry said core strip into said cavity when said welding head means is moved into said cavity; means for moving said spaced banks of welding electrodes away from one another to urge said securement portions of said core strip into engagement with the inner surfaces of said face sheets; a source of welding potential; and welding potential controlling means for impressing said welding potential sequentially across said individually energizable electrodes of each bank to weld said securement portions of said core strips to the inner surfaces of said face sheets.

2. The welding apparatus of claim 1 in which said welding potential is impressed across said welding electrode means and said face sheets.

3. The welding apparatus of claim 1 in which said welding head has lateral indexing means connected thereto for indexing said welding electrode means with respect to said core strip to form first and second series of internal weldments interspersed among one another whereby a continuous series of weldments is provided securing said securement portions of said core strip in operative relationship with the inner surfaces of said face sheets.

4. In the welding apparatus of claim 1 a plurality of separate welding electrode means housings demountably secured to said welding head means, whereby, when one of said welding electrode means becomes qualitatively inoperative, the associated housing can be removed and an identical housing replaces the same without the need for removing all of the welding electrode means.

5. The welding apparatus of claim 1 in which said welding potential is impressed on said face sheets by throat jaws in the weld zone.

6. In a welding apparatus for fabricating a panel including metallic face sheets secured in operative relationship with each other by metallic core strips disposed in the cavity between the confronting inner surfaces of said face sheets, said core strips having securement portions thereupon, the combination of: a movable welding head having oppositely movable mounting means thereupon insertable by said welding head into said cavity; a plurality of individually energizable and movable welding electrode means demountably secured to said mounting means and adapted to receive a core strip for insertion by said welding head into said cavity; expansion means operatively connected to said oppositely movable mounting means for urging said mounting means in opposite directions after said welding head has located a core strip in said cavity, said welding electrode means being engageable with said securement portions; a source of welding potential connected to said welding electrode means; and contactor means interposed between said welding electrode means and said source of welding potential whereby said source of welding potential is pulsed to provide an intermittent series of welding pulses sequentially on the individual ones of said welding electrode means to cause weldment of said securement portions of said core strips to said inner surfaces of said face sheets.

7. A welding apparatus of the character defined in claim 6 in which said welding potential is connected to said face sheets.

8. The welding apparatus of claim 6 in which said welding electrode means consists of a plurality of elongated electrode fingers demountably secured in operative relationship with said mounting means and movable thereby within said cavity in said opposite directions.

9. The welding apparatus of claim 8 in which a group of electrode fingers is mounted in a housing separately secured to said mounting means in conjunction with a plurality of similar housings whereby, should one or more fingers become qualitatively inoperative, the respective housing can be separated from operative engagement with the associated mounting means without disturbing the operative relationship of the other housings with said mounting means.

10. A welding apparatus as defined in claim 8 in which said fingers are resilient and incorporate welding tips on the extremities thereof so that, after said fingers are moved in opposite directions on said associated mounting means into engagement with said securement portions of said core strip, said individual fingers are capable of residual movement during a fraction of the period of time in which the source of welding potential is impressed thereupon.

11. In an internal welding apparatus for welding a composite, metallic panel consisting of metallic face sheets disposed in spaced relationship by metallic core strips having securement portions thereupon for attachment to the inner confronting surfaces of said face sheets which define a cavity for the reception of said core strips, the combination of: a supporting frame; a welding head carriage movable into said cavity, said carriage having jaw means mounted thereupon for movement in opposite directions, said jaw means having operating means operatively connected thereto for causing said movement in said opposite directions; a plurality of electrode fingers mounted on each of said jaw means, said fingers being adapted to transport a core strip into said cavity and being movable by said jaw means in said opposite directions to cause said fingers to engage corresponding areas of said securement portions into intimate contact with said inner surfaces of said surface sheets; and a source of welding potential connected to said fingers to create a series of welding pulses to impress said welding potential on said fingers and create a series of internally generated weldments between said securement portions of said core strips and said face sheets.

12. An internal welding apparatus as defined in claim 11 wherein said welding potential is connected to said fingers and to said face sheets.

13. A welding apparatus as defined in claim 11 in which said fingers are resilient and movable during a fraction of the welding pulse by said resilience to impart a follow-up action to said fingers.

14. A welding apparatus as defined in claim 11 in which said fingers are individually mounted and individually removable to permit the expeditious replacement thereof.

15. A welding apparatus as defined in claim 11 in which said carriage has index means connected thereto for laterally indexing said carriage from a first welding position to a second or third welding position whereby said welding fingers may be moved after creating a first series of welds in said first welding position into a second or third welding position to create a second or third series of welds interspersed among said first series of welds.

16. A welding apparatus of the character defined in claim 11 in which said carriage has jaw adjustment means connected thereto for adjusting the limits of movement of said jaws to permit said welding fingers to accommodate different dimensions of core strip and, thus, different panel dimensions.

17. A welding apparatus of the character defined in claim 11 in which surface sheet throat jaws are mounted on said frame, said surface sheet throat jaws having synchronous adjustment means connected thereto to permit the spacing therebetween to be changed selectively whereby different thicknesses of the panel manufactured in said apparatus can be provided.

18. In an internal welding apparatus for welding a composite, metallic panel consisting of metallic face sheets disposed in spaced relationship by metallic core strips having securement portions thereupon for attachment to the inner confronting surfaces of said face sheets which define a cavity for the reception of said core strips, the combination of: a frame; a first welding head mounted on said frame for movement into and out of said cavity; first individually energizable and movable welding electrode fingers mounted on said first welding head movable into engagement with said securement portions of said strip; a first source of welding potential connected to said welding electrode fingers on said first welding head and adapted to individually and sequentially energize said first welding electrode fingers; a second welding head mounted for movement on said frame; a second welding electrode means mounted on second welding head for movement into said cavity after said first welding head has welded said securement portions of said core strip to said surface sheets; and a second source of welding potential connected to said second welding means to secure portions of said strips intermediate said securement portions to one another.

19. An apparatus of the character defined in claim 18 wherein said first source of welding potential is connected to said first electrode fingers and to said face sheets.

20. An apparatus of the character defined in claim 18 wherein said second source of welding potential is connected to said second welding electrode means and said face sheets.

21. An apparatus of the character defined in claim 18 in which said first and second welding heads are rotatably movable upon said frame into and out of said cavity.

22. An apparatus of the character defined in claim 18 in which said first electrode fingers and second welding means have welding pulse generating means interposed in the first and second welding sources to create discrete welding pulses.

23. An apparatus of the character defined in claim 18 in which the first welding electrode fingers are mounted in banks for movement in opposite directions to engage said supporting portions of said core strip and wherein said second welding electrode means are mounted in a continuous row and individually movable in respect to and engageable with said intermediate portions of said core strip.

* * * * *